United States Patent
Suggs

(10) Patent No.: US 7,840,786 B2
(45) Date of Patent: Nov. 23, 2010

(54) TECHNIQUES FOR STORING INSTRUCTIONS AND RELATED INFORMATION IN A MEMORY HIERARCHY

(75) Inventor: David Neal Suggs, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 551 days.

(21) Appl. No.: 11/735,567

(22) Filed: Apr. 16, 2007

(65) Prior Publication Data

US 2008/0256338 A1  Oct. 16, 2008

(51) Int. Cl.
G06F 9/30 (2006.01)
(52) U.S. Cl. .................... 712/220; 712/213
(58) Field of Classification Search .......... 712/220, 712/213
See application file for complete search history.

(56) References Cited

U.S. PATENT DOCUMENTS

| | | | |
|---|---|---|---|
| 5,761,490 A | | 6/1998 | Hunt |
| 5,887,152 A | * | 3/1999 | Tran .................... 712/217 |
| 5,933,850 A | | 8/1999 | Kumar et al. |
| 6,044,455 A | * | 3/2000 | Hara .................... 712/213 |
| 6,092,182 A | * | 7/2000 | Mahalingaiah .......... 712/213 |
| 6,260,134 B1 | | 7/2001 | Zuraski, Jr. et al. |
| 6,275,927 B2 | | 8/2001 | Roberts |
| 6,324,621 B2 | | 11/2001 | Singh et al. |
| 6,385,720 B1 | * | 5/2002 | Tanaka et al. .......... 712/240 |
| 6,405,303 B1 | | 6/2002 | Miller et al. |
| 6,502,188 B1 | | 12/2002 | Zuraski, Jr. et al. |
| 6,823,444 B1 | * | 11/2004 | Henry et al. .......... 712/207 |
| 6,854,050 B1 | | 2/2005 | Zuraski, Jr. |
| 7,024,545 B1 | | 4/2006 | Zuraski, Jr. et al. |
| 2005/0268046 A1 | | 12/2005 | Heil |

OTHER PUBLICATIONS

Tremaine et al., PINNACLE: IBM MXT in a Memory Controller Chip, Apr. 2001.*

* cited by examiner

Primary Examiner—Alford W Kindred
Assistant Examiner—Jesse R Moll

(57) ABSTRACT

A memory subsystem includes a first memory, a second memory, a first compressor, and a first decompressor. The first memory is configured to store instruction bytes of a fetch window and to store first predecode information and first branch information that characterizes the instruction bytes of the fetch window. The second memory is configured to store the instruction bytes of the fetch window upon eviction of the instruction bytes from the first memory and to store combined predecode/branch information that also characterizes the instruction bytes of the fetch window. The first compressor is configured to compress the first predecode information and the first branch information into the combined predecode/branch information. The first decompressor is configured to decode at least some of the instruction bytes stored in the second memory to convert the combined predecode/branch information into second predecode information, which corresponds to an uncompressed version of the first predecode information, for storage in the third memory.

19 Claims, 4 Drawing Sheets

TECHNIQUES FOR STORING INSTRUCTIONS AND RELATED INFORMATION IN A MEMORY HIERARCHY

CROSS-REFERENCE TO RELATED APPLICATION

Related subject matter is contained in copending U.S. patent application Ser. No. 10/887,069, filed on Jul. 8, 2004, entitled "DATA PROCESSOR HAVING A CACHE WITH EFFICIENT STORAGE OF PREDECODE INFORMATION, CACHE, AND METHOD" by Karthikeyan Muthusamy et al. and assigned to the assignee hereof.

BACKGROUND

1. Field of the Disclosure

The present disclosure is generally directed to a processor and, more particularly, to techniques for storing instructions and related information in a memory hierarchy.

2. Description of the Related Art

A known way to increase the performance of a computer system is to include a local, high-speed memory known as a cache memory (cache). A cache usually increases system performance as there is a high probability that once a central processing unit (CPU) has accessed information (either operand data usually referred to simply as "data" or an instruction) at a particular address, there is a high probability it will access the same address in the future. The cache fetches and stores information that is located adjacent to the requested piece of information from a slower, main memory or lower-level cache. In higher performance computer systems, several caches may be placed in a memory hierarchy. The cache that is closest to the CPU, known as the upper-level or level 1 (L1) cache, is the highest-level cache in the hierarchy and is generally the fastest. Other, generally slower caches are then placed in descending order in the hierarchy starting with a secondary cache known as a level 2 (L2) cache, etc., until the lowest level cache that is connected to main memory. One well-known processor architecture includes separate caches for instructions and data at the L1 level and a combined instruction and data cache at the L2 level.

Each cache line usually includes several bytes and other information about the bytes. For example a field called a "tag" indicates the address at which the cache line is located in memory and is used to determine whether an access "hits" or "misses" in the cache. Other useful information that characterizes the instructions or data may be stored in the cache line as well, such as error correcting code (ECC) bits and in the case of instructions, bits that characterize the instructions in the respective cache line.

These instruction characterizing bits may include predecode bits. For example one popular class of microprocessors is based on the so-called x86 instruction set, which is a so-called variable length instruction set, because the length of the instruction operational codes (opcodes) can vary between one and fifteen bytes. In a superscalar implementation of an x86 microprocessor, it is desirable to determine where the instruction boundaries are in order to dispatch multiple instructions per clock cycle. However, the determination of the instruction boundaries within a group of bytes is usually a time-consuming sequential process. In general, each instruction end must be determined before the next instruction can be examined. To facilitate multiple instruction issue without delay, this type of information may be stored along with the instructions in the cache.

Another example of characterizing bits is branch prediction bits. Branch prediction bits are useful when performing speculative execution of instructions. Speculative execution involves the process of guessing whether a conditional branch will be taken. The prediction may later prove to be correct or incorrect. If the prediction is later proved to be correct, then performance is improved by immediate processing of instructions along the predicted path through the pipeline before the condition is resolved. If the prediction is later proved to be incorrect, then the pipeline must be flushed of the instructions in progress, and extra cycles are required to "catch up." Thus, the improvement in efficiency depends on the prediction accuracy. Branch prediction bits characterize the existence of branch instructions in a group of instructions and the nature of the branch, such as unconditional (static) versus conditional (dynamic).

In general, there is a space penalty for storing characterizing bits in a multi-level cache hierarchy. It is usually desirable to make the size of the L2 cache relatively large, such as 1 megabyte (MB), and the size of the L2 cache alone can be a significant fraction of the die area of the microprocessor. Storing these additional characterizing bits in lower-level caches can cause total die size to increase significantly.

What is needed is a processor that retains the benefit of storing characterizing bits while reducing the size of lower-level caches.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
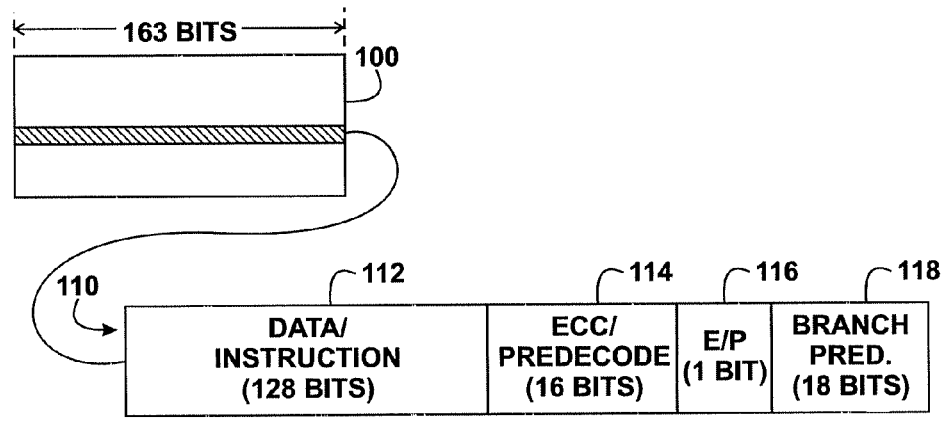
FIG. 1 illustrates, in block diagram form, a prior art L2 cache.

According to various aspects of the present disclosure, information stored in lower levels of a memory hierarchy is compressed to reduce storage requirements in the lower levels of the memory hierarchy. With reference to FIG. 1, an L2 cache 100 known in the prior art is illustrated in block diagram form. The L2 cache 100 has a set of cache lines and FIG. 1 illustrates a representative cache line 110. In the illustrated example, the cache line 110 includes a 128-bit data/instruction field 112, a 16-bit error correction code (ECC)/predecode field 114, a one-bit ECC/predecode (E/P) indication field 116, and an 18-bit branch prediction field 118. Ignoring the corresponding tag bits, each of the cache lines 110 in the L2 cache 100 is 163 bits in length, of which 128 bits are data or instruction bits, depending on whether the cache lines 110 are associated with a data or an instruction cache at the L1 level. The remaining bits include useful information about the data or instructions. The E/P bit indicates whether the ECC/predecode field 114 stores a 16-bit ECC (in the case of data) or sixteen predecode bits (in the case of instructions). Finally, the branch prediction field 118 stores eighteen branch prediction bits. In the event that the cache line 110 stores a line of data from the data cache, branch prediction field 118 is not used.

In this example, the L2 cache 100, thus, stores thirty-five extra bits per cache line. The retention and storage of the extra bits improves the performance of the processor when a cache line that was evicted from the L1 cache is again required by the program. That is, the retention and storage of the extra bits saves the time that would otherwise be required to predecode the instruction boundaries and decode information about branch instructions. However, since the L2 cache 100 is preferably quite large, such as 1 MB, storing the extra bits may require a relatively substantial amount of integrated circuit area.

It should be appreciated that the techniques disclosed herein are broadly applicable to cache lines that have more or less than the illustrated number of bits. According to various aspects of the present disclosure, the extra bits can be compressed into fewer bits, saving substantial storage area in lower-levels of cache. Furthermore, the compression can take various forms selected according to the usage of the bits. First, the predecode bits represent information that must be exactly correct before the corresponding instruction or instructions can be dispatched. For better performance, the predecode field can be compressed by discarding some information that can be quickly re-created when the line is again loaded into the instruction cache. Techniques for compression and decompression that avoid the long sequential process of parsing instruction boundaries are further described below. Second, the branch prediction bits need not be exactly correct because the only consequence of discarding them is lower processing efficiency. Additional branch prediction bits help to speculatively execute correct program threads, but obey a law of diminishing returns for each additional branch instruction that may be in a given cache line and for extra bits for discriminating the type of branch. Thus, the eighteen branch prediction bits, in the example illustrated in FIG. 1, can be represented in a fewer number of bits that preserve a substantial majority of the benefit of the eighteen bits.

Figure 2:
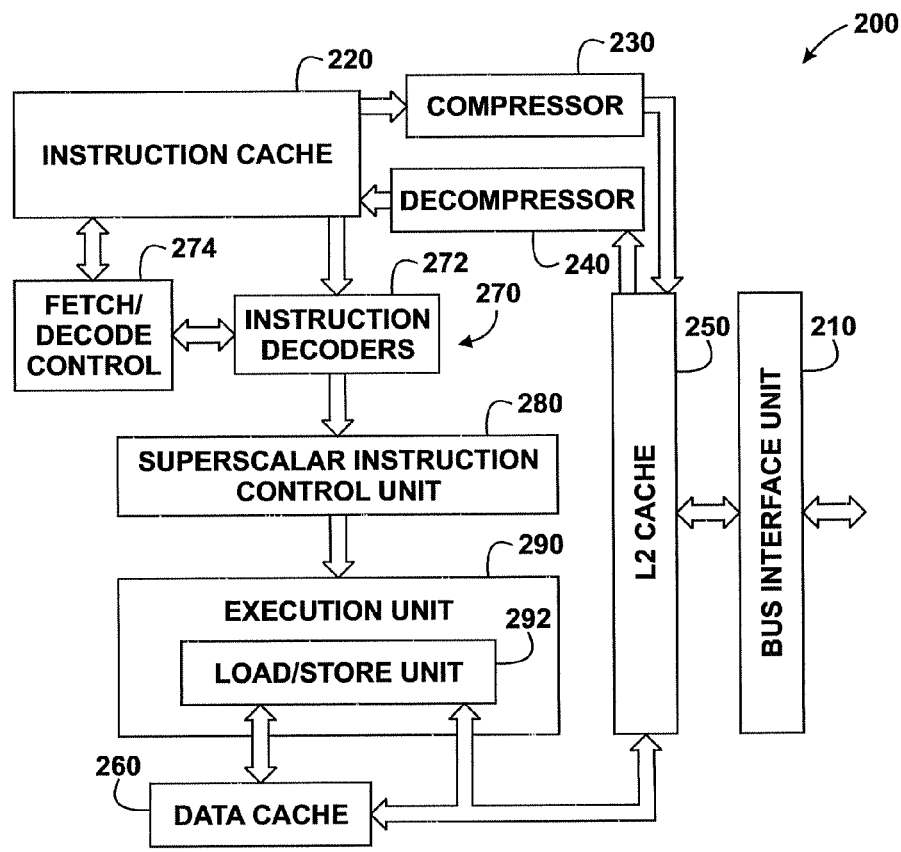
FIG. 2 illustrates, in block diagram form, a processor that includes an L1 cache and an L2 cache.

Moving to FIG. 2, a processor 200 is illustrated in block diagram form. The processor 200 may take the form of a single-chip microprocessor which includes a bus interface unit (BIU) 210, an instruction (L1) cache 220, a compressor 230, a decompressor 240, an L2 cache 250, a decoder 270, a superscalar instruction control (ICU) unit 280, and an execution unit 290. The BIU 210 has a bi-directional connection to an external memory system (not shown in FIG. 2), which may take the form of a memory controller associated with a circuit commonly called a "Northbridge." The Northbridge may be off-chip, or integrated with the processor 200 on the same chip. The BIU 210 is responsible for initiating and controlling all memory accesses with the Northbridge and providing an instruction stream (from the external memory system) to the L1 cache 220. The BIU 210 is also responsible for performing accesses to store or fetch required data from the memory system and to both provide the data to data cache 260 and forward operands to a load/store unit (LSU) 292 for immediate use.

In FIG. 2, the L1 cache 220 is dedicated to storing instructions. Thus, the L1 cache 220 provides a stream of multiple instructions, as requested by the decoder 270 based on program flow. The L1 cache 220 also provides instructions that are being evicted so that they may be stored in the L2 cache 250. It should be noted that the cache compression system is applicable to other cache systems, such as those with separate instruction and data caches at the L2 level. However, the benefits of compression are especially useful in a combined instruction/data cache as the set of compressed bits characterizing the instructions can for the most part fit into extra bits already allocated for data.

Instructions are stored in the L2 cache 250 from the L1 cache 220 by means of a compressor 230, and retrieved from the L2 cache 250 and stored in the L1 cache 220 by means of a decompressor 240. The operation of the compressor 230 and the decompressor 240 are explained in greater detail below. The decoder 270 is responsible for supplying decoded instructions to the ICU 280 and includes a set of instruction decoders 272 and a fetch/decode control block 274. The fetch/decode control block 274 accesses the L1 cache 220 to provide instructions (for decode) to the instruction decoders 272 by predicting program flow using branch prediction techniques. The L1 cache 220 also provides predecode information to the fetch/decoder control block 274 for storage back into the L1 cache 220.

The ICU 280 receives the decoded instructions and dispatches them to appropriate ones of multiple functional units in the execution unit 290. The ICU 280 also retires instruction after they are completed by the appropriate functional unit and commits the results to the architectural state of the processor 200. The execution unit 290 typically includes multiple functional units. In the execution unit 290, the functional units are usually broken down into two groups, integer execution units (IEUs) and floating point units (FPUs). The composition and operation of the functional units is not especially relevant to understanding of the present disclosure and, as such, are not discussed further herein. One particular functional unit of interest is the LSU 292, which accesses the data cache 260 to fetch and store data operands as directed by the program. In addition, the LSU 292 is coupled to the BIU 210, which forwards operands requested by the program flow while simultaneously storing the operands in the data cache 260.

In general, additional details of the processor 200 are not particularly relevant to the present disclosure. However, the fact that the processor 200 is a superscalar processor that implements a variable length instruction set is noteworthy as the processor 200 requires that the boundaries of variable length instructions be determined prior to dispatch of the instructions. In this regard, the processor 200 may execute instructions of the x86 instruction set architecture (ISA).

Figure 3:
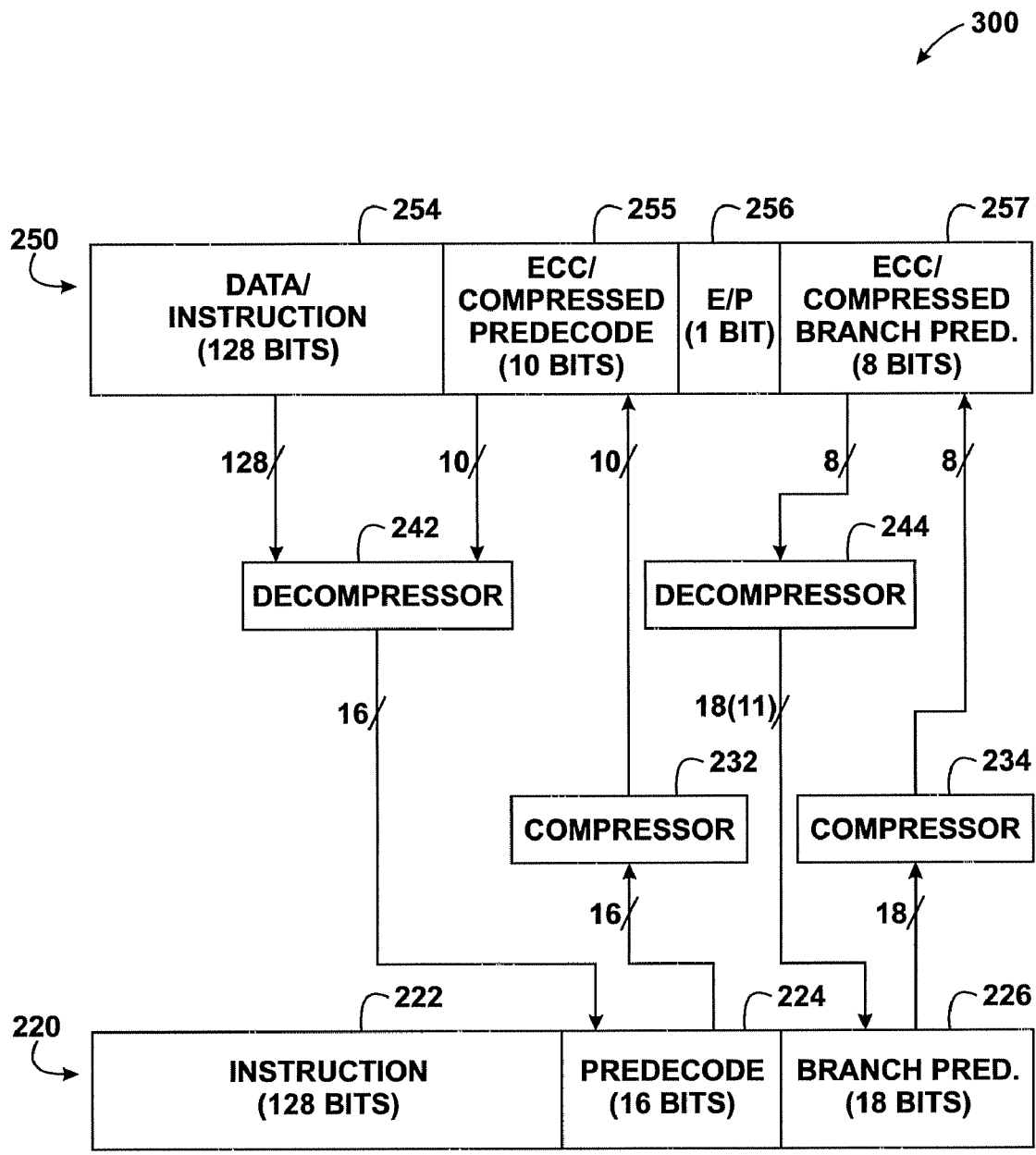
FIG. 3 illustrates, in block diagram form, a portion of the processor of FIG. 2.

The compressed instruction related information storage in the L2 cache 250 may be better understood with reference to FIG. 3, which illustrates a portion 300 of the processor 200 of FIG. 2 including the L1 cache 220, the L2 cache 250, the compressor 230 (formed by compressor circuits 232 and 234), and the decompressor 240 (formed by decompressor circuits 242 and 244). The L1 cache 220 includes a plurality of lines storing, for example, 64 Kbytes of instructions along with additional bits associated with the at least one instruction stored in the corresponding cache line. Thus, in this example, each line in the L1 cache 220 includes a 128-bit (16-byte) instruction field 222, a 16-bit predecode field 224, and an 18-bit branch prediction field 226. In this example, the instruction field 222 stores sixteen instruction bytes. In the x86 instruction set, instructions can vary from one to fifteen bytes in length. Thus, in a processor implementing the x86 instruction set, the sixteen instruction bytes correspond to two or more instructions, depending on the length of the instructions within the sixteen instruction bytes. Due to the variable length nature of the x86 instruction set, the instruction field 222 of a given instruction cache line may not include any complete instruction, but there will always be at least one instruction that ends somewhere in the cache line. In other embodiments with different line sizes, all cache lines may not include instruction ends, but some will.

The predecode field 224 indicates the length of the instructions or portions of instructions in the instruction field 222 of the corresponding cache line. The predecode field 224 indicates the instruction length by indicating an ending position of the instruction. In one embodiment, the predecode field 224 stores 16-bits (one predecode bit per instruction byte) in which a zero indicates that a corresponding one of the 16-bytes in the instruction field 222 is not the last byte of an instruction, and a one indicates that the corresponding byte is the last byte of an instruction. These bits allow the instruction decoders 272 to parse the instructions so that the ICU 280 can dispatch several instructions per clock cycle. In this example, the branch prediction field 226 stores 18-bits for implementing branch prediction. These bits include bits for the type of branch (forward, backward, conditional (dynamic), absolute, etc.) and a taken/not taken history. If the branch is correctly predicted, the program is able to execute instructions down the predicted path before the branch is resolved. If the branch is incorrectly predicted, then the processor "backs up" and the results obtained during execution of instructions down the mispredicted path are discarded. In either case program operation is correct, but with lower processing efficiency in the case of a mispredicted branch.

The L2 cache 250 includes a plurality of lines for storing, for example, 1 MB of instructions and data, along with additional bits associated with either instructions or data in the corresponding cache line. In one embodiment, the L2 cache 250 includes a 128-bit data/instruction field 254, a 10-bit ECC/compressed predecode field 255, a 1-bit E/P field 256, and an 8-bit ECC/compressed branch prediction field 257. The use of the fields 255-257 can be further understood from the description of the compression and decompression processes below.

With reference to FIG. 3, the compressor 230 of FIG. 2 is formed by the compressor circuit 232 and the compressor circuit 234. The compressor circuit 232 has an input connected to the output of the predecode field 224 and an output connected to the ECC/compressed predecode field 255. The compressor circuit 232 discards some of the bits of the predecode field 224 that may be readily recreated when the line is returned to another line in the L1 cache 220 without sequential processing. The technique the compressor circuit 232 employs is described in further detail below. The compressor circuit 232 examines two groups of eight predecode bits and compresses each group of eight bits into a corresponding compressed field of five bits. An example encoding scheme is shown in TABLE I below:

TABLE I

| EndBits [7:0] | Encoding [4:0] | Explanation of indeterminate fields |
|---|---|---|
| 00000000 | 00000 | |
| 00000xx1 | 00001 | xx indicates 1- or 2-byte opcodes in 1 and 2 |
| 0000xx10 | 00010 | xx indicates 1- or 2-byte opcodes in 2 and 3 |
| 000xx100 | 00011 | xx indicates 1- or 2-byte opcodes in 3 and 4 |
| 00xx1000 | 00100 | xx indicates 1- or 2-byte opcodes in 4 and 5 |
| 0xx10000 | 00101 | xx indicates 1- or 2-byte opcodes in 5 and 6 |
| xx100000 | 00110 | xx indicates 1- or 2-byte opcodes in 6 and 7 |
| x1000000 | 00111 | x indicates one-byte opcode in 7 |
| 10000000 | 01000 | |
| 00xx1xx1 | 01001 | xx indicates 1- or 2-byte opcodes in 1-2 and 4-5 |
| 0xx10xx1 | 01010 | xx indicates 1- or 2-byte opcodes in 1-2 and 5-6 |
| xx100xx1 | 01011 | xx indicates 1- or 2-byte opcodes in 1-2 and 6-7 |
| x1000xx1 | 01100 | xx indicates 1- or 2-byte opcodes in 1-2 and 7 |

TABLE I-continued

| EndBits [7:0] | Encoding [4:0] | Explanation of indeterminate fields |
|---|---|---|
| 10000xx1 | 01101 | xx indicates 1- or 2-byte opcodes in 1-2 |
| 0xx1xx10 | 01110 | xx indicates 1- or 2-byte opcodes in 3-4 and 5-6 |
| xx10xx10 | 01111 | xx indicates 1- or 2-byte opcodes in 3-4 and 6-7 |
| x100xx10 | 10000 | xx indicates 1- or 2-byte opcodes in 3-4 and 7 |
| 1000xx10 | 10001 | xx indicates 1- or 2-byte opcodes in 3-4 |
| xx1xx100 | 10010 | xx indicates 1- or 2-byte opcodes in 3-4 and 6-7 |
| x10xx100 | 10011 | xx indicates 1- or 2-byte opcodes in 3-4 and 7 |
| 100xx100 | 10100 | xx indicates 1- or 2-byte opcodes in 3-4 |
| x1xx1000 | 10101 | xx indicates 1- or 2-byte opcodes in 4-5 and 7 |
| 10xx1000 | 10110 | xx indicates 1- or 2-byte opcodes in 4-5 |
| 1xx10000 | 10111 | xx indicates 1- or 2-byte opcodes in 5-6 |
| x1xx1xx1 | 11000 | xx indicates 1- or 2-byte opcodes in 1-2/4-5/7 |
| 1xx1xx10 | 11001 | xx indicates 1- or 2-byte opcodes in 3-4 and 5-6 |
| 1xx10xx1 | 11010 | xx indicates 1- or 2-byte opcodes in 1-2 and 5-6 |
| 10xx1xx1 | 11011 | xx indicates 1- or 2-byte opcodes in 1-2 and 4-5 | in which 'xx' represents a value determined by the instruction bits in the corresponding byte positions as follows: 00 represents no one-byte opcodes in either byte; 01 represents a one-byte opcode in the less significant byte and no one-byte opcode in the more significant byte; 10 represents a two-byte opcode that starts in the less significant byte and ends in the more significant byte; and 11 represents one-byte opcodes in both byte positions.

The decompressor 242 decompresses the compressed predecode bits by mapping the 5-bit field to the corresponding 8-bit field and performing one-byte and two-byte opcode determinations using relatively simple combinatorial logic on the corresponding bits. Thus, the reconstruction of the extra information can usually be performed without delaying instruction processing when the line is returned from the L2 cache as required by the program.

The compressor 234 performs a similar operation on the branch prediction bits, except that the compression performed by the compressor 234 is a lossy compression. The eighteen branch prediction bits are defined as follows: nine bits are used to mark branches in a 16-byte cache line (or fetch window); three end adjustment bits are employed to indicate whether each of up to three branches ends on an even byte or an odd byte; and six bits (two for each of up to three branches) are used to indicate branch type for up to three branches. Within a 9-bit branch marker field, the first bit marks a branch at byte 0, the ninth bit marks a branch at byte 15, and intermediate bits mark a branch at either of two adjacent bytes. For example, bit one marks a branch at either byte one or byte two, bit two marks a branch at either byte three or byte four, etc. This encoding is usually adequate as almost all of the branches in the x86 instruction set are at least two bytes long. As such, missing a rare case in which a two-byte branch is followed by a one-byte branch is acceptable. As noted above, the six bits that indicate branch type include three pairs of bits, i.e., a pair of bits to indicate the type of branch for each of up to three branches in the 16-byte cache line (fetch window). These pairs are encoded as follows: 00 indicates an always taken jump; 01 indicates a conditional (dynamic) branch; 10 indicates a call; and 11 indicates a return. A branch is marked dynamic if it is a conditional relative branch that was taken initially and later executed as non-taken.

Execution of benchmark programs indicates that about ninety percent of the time there is only one branch within a 16-byte cache line (fetch window), and about ninety-nine percent of the time there are two or fewer branches. As such, most of the performance can be retained by saving information for only up to two branches, while suffering rare performance penalties for lines with three or more branches.

An example branch prediction compression scheme compresses the nine-bit field as shown in TABLE II:

TABLE II

| Branch marker bits [8:0] | Brn1 Dynamic | Brn2 Dynamic | Brn3 Dynamic | Encoding [5:0] |
|---|---|---|---|---|
| 0_0000_0000 | x | x | x | 000000 |
| 0_0000_0001 | x | x | x | 000001 |
| 0_0000_0010 | x | x | x | 000010 |
| 0_0000_0100 | x | x | x | 000011 |
| 0_0000_1000 | x | x | x | 000100 |
| 0_0001_0000 | x | x | x | 000101 |
| 0_0010_0000 | x | x | x | 000110 |
| 0_0100_0000 | x | x | x | 000111 |
| 0_1000_0000 | x | x | x | 001000 |
| 1_0000_0000 | x | x | x | 001001 |
| 0_0000_0011 | x | x | x | 001010 |
| 0_0000_0101 | x | x | x | 001011 |
| 0_0000_1001 | x | x | x | 001100 |
| 0_0001_0001 | x | x | x | 001101 |
| 0_0010_0001 | x | x | x | 001110 |
| 0_0100_0001 | x | x | x | 001111 |
| 0_1000_0001 | x | x | x | 010000 |
| 1_0000_0001 | x | x | x | 010001 |
| 0_0000_0110 | x | x | x | 010010 |
| 0_0000_1010 | x | x | x | 010011 |
| 0_0001_0010 | x | x | x | 010100 |
| 0_0010_0010 | x | x | x | 010101 |
| 0_0100_0010 | x | x | x | 010110 |
| 0_1000_0010 | x | x | x | 010111 |
| 1_0000_0010 | x | x | x | 011000 |
| 0_0000_1100 | x | x | x | 011001 |
| 0_0001_0100 | x | x | x | 011010 |
| 0_0010_0100 | x | x | x | 011011 |
| 0_0100_0100 | x | x | x | 011100 |
| 0_1000_0100 | x | x | x | 011101 |
| 1_0000_0100 | x | x | x | 011110 |
| 0_0001_1000 | x | x | x | 011111 |
| 0_0010_1000 | x | x | x | 100000 |
| 0_0100_1000 | x | x | x | 100001 |
| 0_1000_1000 | x | x | x | 100010 |
| 1_0000_1000 | x | x | x | 100011 |
| 0_0011_0000 | x | x | x | 100100 |
| 0_0101_0000 | x | x | x | 100101 |
| 0_1001_0000 | x | x | x | 100110 |
| 1_0001_0000 | x | x | x | 100111 |
| 0_0110_0000 | x | x | x | 101000 |
| 0_1010_0000 | x | x | x | 101001 |
| 1_0010_0000 | x | x | x | 101010 |
| 0_1100_0000 | x | x | x | 101011 |
| 1_0100_0000 | x | x | x | 101100 |
| 1_1000_0000 | x | x | x | 101101 |

The compressed encoding includes six encoded branch marker bits and two other bits. In one embodiment, the information held by the two other bits depends on the number of branches. If there is only one branch, then the two other bits encode two bits of information for that branch to select between a CALL instruction, a RET (return) instruction, a unconditional (static) branch, and a conditional (dynamic) branch. If there are two branches (after dropping the third branch when necessary), each of the two other bits indicates whether the corresponding branch is a static branch or a dynamic branch. Since it takes a long time to determine whether a branch is static or dynamic, that information is usually more desirable to retain.

Thus, two compression examples for storing fewer bits in an L2 cache have been disclosed herein. In one case (predecode bits), it is advantageous to re-create the predecode field exactly when the instruction is returned to the instruction cache. In this case, the compressed bits are remapped and fields that can be readily decoded from the instructions themselves (in a fast combinatorial decode step) are reconstructed. In another case (branch prediction bits), the bits do not need to be recreated exactly for correct program operation. In this case, some of the information is discarded, but the bits that contributed to most of the useful branch prediction are retained. In any case, the decompressor 244 may return up to eighteen bits, at least eleven of which may contain useful information, when the branch prediction bits are returned from the cache 250 to the cache 220. It should be apparent that other types of instruction information may be stored in a compressed form in the L2 cache, according to various disclosed techniques.

While the discussion above, considered the additional fields to be stored in the same line of the cache as the instruction, it should be appreciated that the additional fields may be considered to be stored in the line by association with the one or more instructions in that line, regardless of the physical structure used to hold the additional information. For example the additional information can be stored in a separate array (or arrays) or table (or tables) that is (are) associated with the corresponding line of the cache. It should be noted that the predecode bits can indicate the length of the variable length instruction (or instructions) in the cache line by indicating the starting location rather than the ending location. In general, the technique described above is applicable to fetch windows of sixteen bytes, irrespective of a cache line length. Moreover, while the example is addressed to a cache line of sixteen bytes, the technique may be readily extended to cache lines having more or less than sixteen bytes and fetch windows having more or less than sixteen bytes.

According to another aspect of the present disclosure, a processor employs three levels of cache in a memory hierarchy. In this embodiment: an L1 cache stores 16-bits of predecode information and 27-bits of branch prediction information; an L2 caches stores 10-bits of compressed predecode information and 8-bits of compressed branch prediction information; and an L3 cache stores 10-bits of compressed predecode/branch prediction information. The information stored in the L1, L2, and L3 caches is described in further detail below.

According to one embodiment, a memory subsystem includes a first memory (e.g., an L2 cache), a second memory (e.g., an L3 cache), a first compressor, and a first decompressor. The first memory is configured to store instruction bytes of a fetch window and to store first predecode information and first branch information that characterizes the instruction bytes of the fetch window. The second memory is configured to store the instruction bytes of the fetch window upon eviction of the instruction bytes from the first memory and to store combined predecode/branch information that also characterizes the instruction bytes of the fetch window. The first compressor is coupled between the first memory and the second memory and is configured to compress the first predecode information and the first branch information into the combined predecode/branch information. The first decompressor is coupled between the second memory and a third memory (e.g., an L1 cache) and is configured to decode at least some of the instruction bytes stored in the second memory to convert the combined predecode/branch information into second predecode information for storage in the third memory. The second predecode information corresponds to an uncompressed version of the first predecode information.

According to another embodiment, a method of maintaining information in a memory subsystem includes storing instruction bytes of a fetch window in a first memory (e.g., an L2 cache). First predecode information and first branch information that characterizes the instruction bytes of the fetch window is also stored in the first memory. The instruction bytes of the fetch window are stored in a second memory (e.g., an L3 cache) upon eviction of the instruction bytes from the first memory. The first predecode information and the first branch information are compressed into combined predecode/branch information that also characterizes the instruction bytes of the fetch window. The combined predecode/branch information is stored in the second memory. At least some of the instruction bytes stored in the second memory are decoded to convert the combined predecode/branch information into second predecode information for storage in a third memory (e.g., an L1 cache). The second predecode information corresponds to an uncompressed version of the first predecode information.

According to a different embodiment, a processor includes a load/store unit, a first memory (e.g., an L2 cache), a second memory (e.g., an L3 cache), and a first compressor. The first memory is coupled to the load/store unit and is configured to store instruction bytes of a fetch window and to store first predecode information and first branch information that characterizes the instruction bytes of the fetch window. The second memory is configured to store the instruction bytes of the fetch window upon eviction of the instruction bytes from the first memory and to store combined predecode/branch information that also characterizes the instruction bytes of the fetch window. The first compressor is coupled between the first memory and the second memory and is configured to compress the first predecode information and the first branch information into the combined predecode/branch information.

Figure 4:
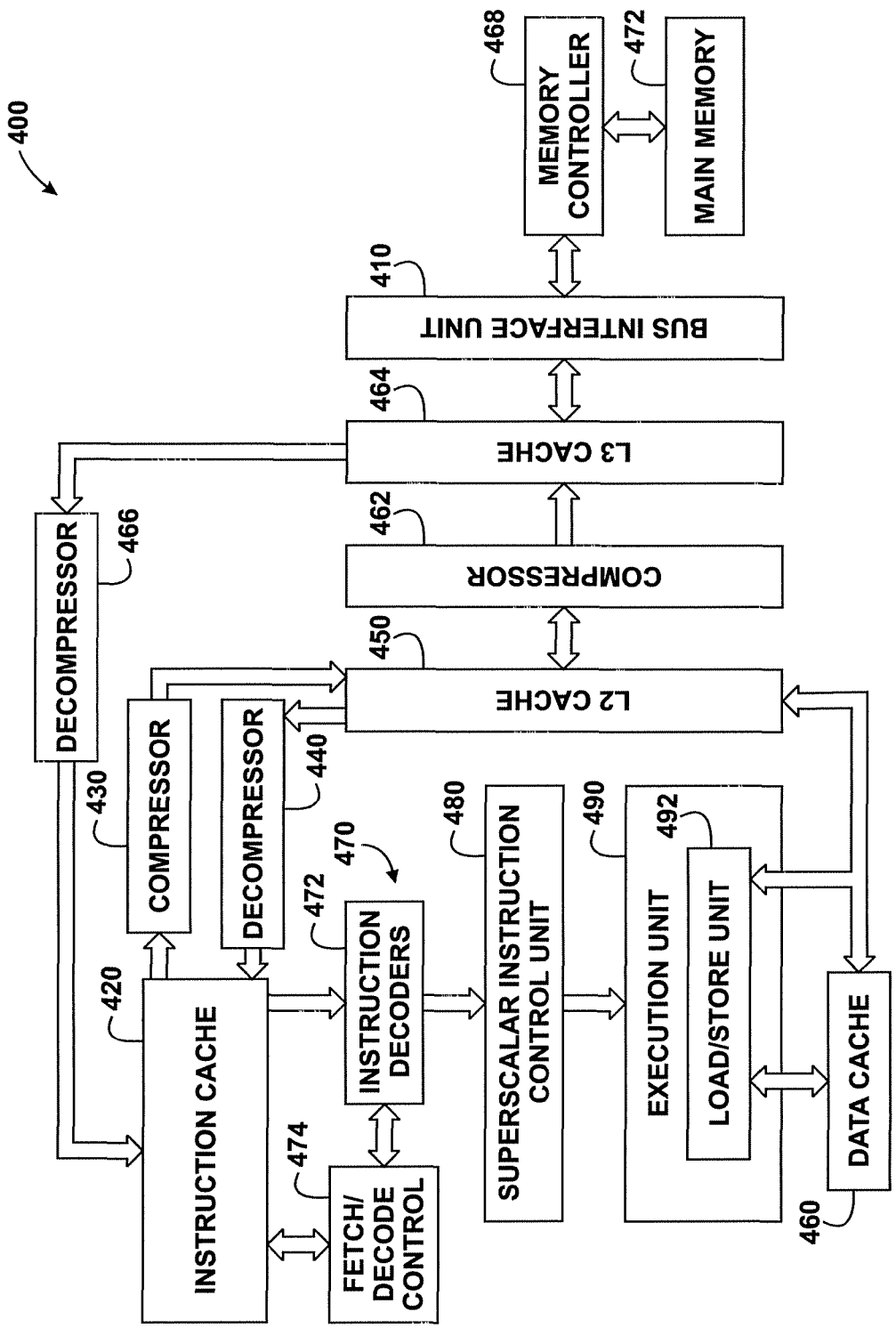
FIG. 4 illustrates, in block diagram form, a processor that includes an L1, cache, an L2 cache, and an L3 cache that are configured according to an embodiment of the present disclosure.

Moving to FIG. 4, a portion of an example processor 400, configured according to an embodiment of the present disclosure, is illustrated. The processor 400 may be part of a multi-core processor that takes the form of a single-chip multi-core processor. The processor 400 includes a bus interface unit (BIU) 410, an instruction (L1) cache 420, a compressor 430, a decompressor 440, an L2 cache 450, a compressor 462, an L3 cache 464, a decompressor 466, a decoder 470, a superscalar instruction control unit (ICU) 480, and an execution unit 490. The BIU 410 has a bi-directional connection to an external memory system, which may take the form of a memory controller 468 associated with a circuit commonly called a "Northbridge". The Northbridge may be off-chip, or integrated with the processor 400 on the same chip. The BIU 410 is responsible for initiating and controlling all memory accesses with the Northbridge and providing an instruction stream (from external main memory 472) to instruction cache 420. The BIU 410 also performs accesses to store or fetch required data from the memory system and to both provide the data to data cache 460 and forward operands to a load/store unit (LSU) 492 for immediate use.

In FIG. 4, the L1 cache 420 is dedicated to storing instructions. Thus, the L1 cache 420 provides a stream of multiple instructions as requested by the decoder 470 based on program flow. The L1 cache 420 also provides instructions that are being evicted so that they may be stored in the L2 cache 450. Similarly, the L2 cache 450 provides evicted instructions for storage in the L3 cache 464. It should be noted that the cache compression system disclosed herein is applicable to other cache systems, such as those with separate instruction and data caches at the L2 and L3 levels. However the benefits of compression are especially useful in a combined instruction/data cache as the set of compressed bits characterizing the instructions can for the most part fit into extra bits already present for data.

Instructions are stored in the L2 cache 450 from the L1 cache 420 via the compressor 430, and retrieved from the L2 cache 450 and stored in the L1 cache 420 via the decompressor 440. The operation of the compressor 430 and the decompressor 440 are explained in greater detail below. Similarly, instructions are stored in the L3 cache 464 from the L2 cache 450 via the compressor 462, and retrieved from the L3 cache 464 and stored in the L1 cache 420 via the decompressor 466. The operation of the compressor 462 and the decompressor 466 are also explained in greater detail below.

The decoder 470 is responsible for supplying decoded instructions to the ICU 480 and includes a set of instruction decoders 472 and a fetch/decode control block 474. The fetch/decode control block 474 accesses the L1 cache 420 to provide instructions (for decode) to the instruction decoders 472 by predicting program flow using branch prediction techniques. The L1 cache 420 also provides predecode information to the fetch/decoder control block 474 for storage back into the L1 cache 420. The ICU 480 receives the decoded instructions and dispatches them to appropriate ones of multiple functional units in the execution unit 490. The ICU 480 also retires instructions after they are completed by the appropriate functional unit and commits the results to the architectural state of the processor 400.

The execution unit 490 typically includes multiple functional emits. In the execution unit 490, the functional units are usually broken down into two groups, integer execution units (IEUs) and floating point units (FPUs). The composition and operation of the functional units is not particularly relevant to understanding of the present disclosure and, as such, are not discussed further herein. One particular functional unit of interest is the LSU 492, which accesses the data cache 460 to fetch and store data operands as directed by the program. In addition, the LSU 492 is coupled to the BIU 410, which forwards operands requested by the program flow while simultaneously storing the operands in the data cache 460.

As above, most of the details of the processor 400 are not particularly relevant to the present disclosure. However, the fact that the processor 400 is a superscalar processor that implements a variable length instruction set is noteworthy as the processor 400 requires determination of the boundaries of variable length instructions prior to the instructions being dispatched. In this regard, the processor 400 may also execute instructions of the x86 instruction set.

Figure 5:
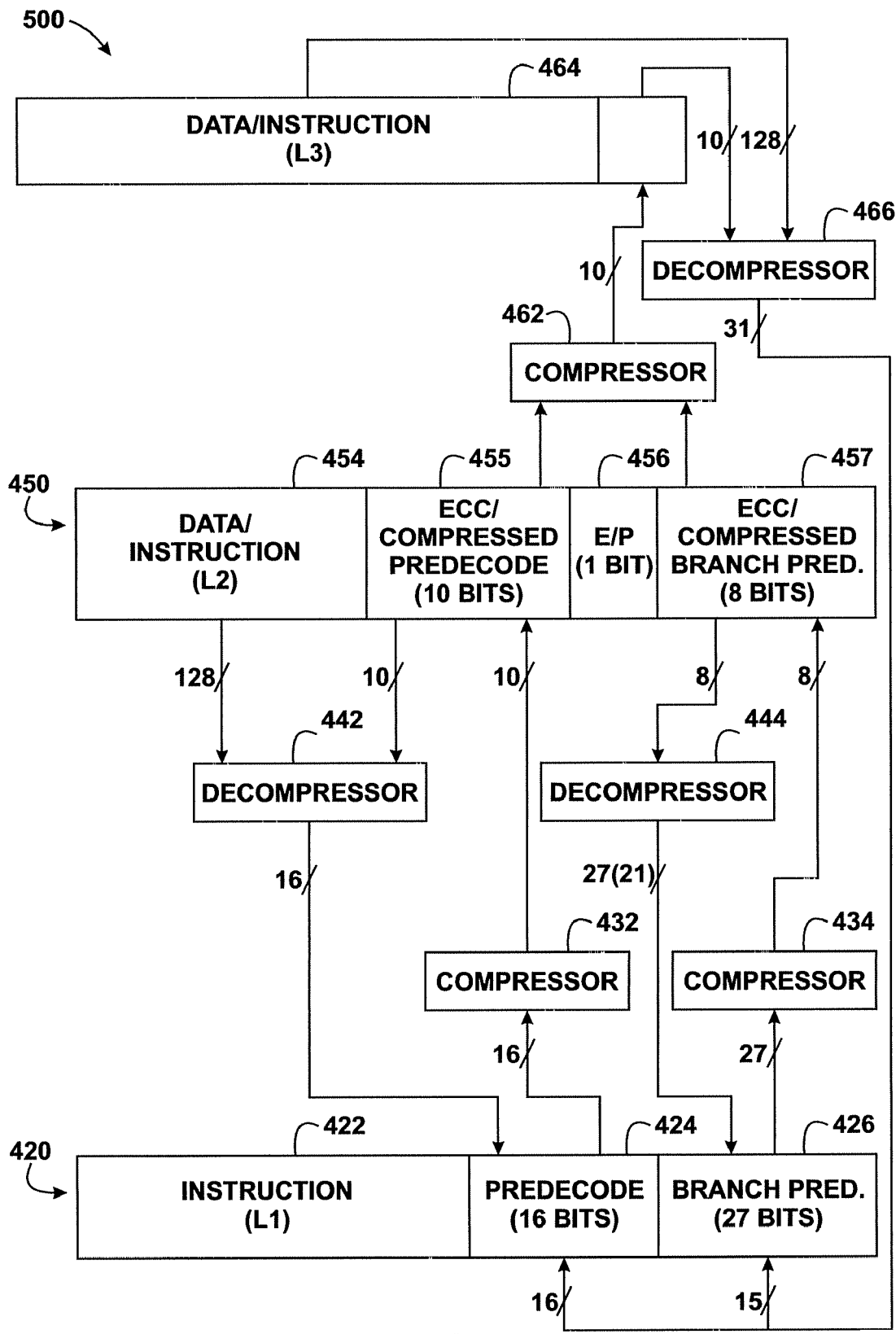
FIG. 5 illustrates, in block diagram form, a portion of the processor of FIG. 4.

The details of the compressed instruction storage in the L2 cache 450 may be better understood with reference to FIG. 5, which illustrates in block diagram form a portion 500 of the processor 400 of FIG. 4 including the L1 cache 420, the L2 cache 450, the L3 cache 464, the compressor 430 (formed by compressor circuits 432 and 434), the decompressor 440 (formed by decompressor circuits 442 and 444), the compressor 462, and the decompressor 466. The L1 cache 420 includes a plurality of lines storing, for example, 64 Kbytes of instructions along with additional bits associated with the at least one instruction stored in the corresponding cache line. For example, in a cache line storing sixteen instruction bytes, each line in the L1 cache 420 includes a 128-bit instruction field 422, a 16-bit predecode field 424, and a 27-bit branch prediction field 426. In this example, the instruction field 422 stores sixteen instruction bytes, which correspond to a fetch window. The sixteen instruction bytes in a fetch window correspond to two or more instructions, depending on the lengths of the instructions in the fetch window. Due to the variable length nature of the x86 instruction set, the instruction field of any given instruction cache line, depending upon a length of the cache line, may not include a complete instruction, but there will always be at least one instruction that ends somewhere in the cache line. In other embodiments with different line size, not all lines will necessarily include instruction ends, but at least some lines will.

The instruction predecode field 424 indicates the length of the instructions in the instruction field 422 of the corresponding cache line. The instruction predecode field 424 indicates an instruction length by indicating an ending position of the instruction. In one embodiment, the predecode field 424 stores 16-bits in which a zero indicates that a corresponding one of the 16-bytes in the instruction field 422 is not the last byte of an instruction, and a one indicates that the corresponding byte is the last byte of the instruction. These bits allow the instruction decoders 472 to parse the instructions so that the ICU 480 can dispatch several instructions per clock cycle. A branch prediction field 426 stores 27-bits, which are described further below, for implementing branch prediction.

The L2 cache 450 includes a plurality of lines for storing, for example, 1 MB of instructions and data, along with additional bits associated with either instructions or data in the corresponding cache line. In one embodiment, the L2 cache 450 includes a 128-bit instruction field 454, a 10-bit ECC/compressed predecode field 455, a 1-bit E/P field 456, and an 8-bit ECC/compressed branch prediction field 457. The use of the fields 455-457 can be further understood from the description of the compression and decompression processes below.

FIG. 5 illustrates that the compressor 430 of FIG. 4 is formed by the compressor circuit 432 and the compressor circuit 434. The compressor circuit 432 has an input connected to the output of the predecode field 424, and an output connected to the ECC/compressed predecode field 455. The compressor circuit 432 discards some of the bits of the predecode field 424 that may be readily recreated when the line is returned to another line in the L1 cache 420 without sequential processing. The technique the compressor circuit 432 employs is described in further detail below. The compressor circuit 432 examines two groups of eight predecode bits and compresses each group of eight bits into a corresponding compressed field of five bits, which may take the form of the encoding scheme shown in TABLE I above.

The decompressor 442 decompresses the compressed predecode bits by mapping the 5-bit field to the corresponding 8-bit field and performing one-byte and two-byte opcode determinations using simple combinatorial logic on the corresponding bits. Thus, the reconstruction of the extra information can usually be performed without delaying instruction processing when the line is returned from the L2 cache 450 as required by the program. The compressor 434 performs a similar operation on the branch prediction bits, except that the compression performed by the compressor 434 is a lossy compression. In any case, the decompressor 444 may return up to twenty-seven bits, at least twenty-one of which may contain useful information, when the branch prediction bits are returned from the cache 450 to the cache 420. According to this embodiment, the branch prediction bits are further defined below with respect to TABLES IV and V-I through V-IX.

According to another aspect of the present disclosure, predecode and branch information stored in the L2 cache 450 is further compressed for storage in the L3 cache 464. As is illustrated in FIG. 5, the compressor 462 compresses 10-bits of predecode information and 8-bits of branch information into a 10-bit encoding. The decompressor 466, decompresses the 10-bit encoding stored in the L3 cache 464 to 16-bits of predecode information and 15-bits of branch information. While the discussion herein focuses on compressing information between and L1 cache and an L2 cache and between and L2 cache and an L3 cache, it is contemplated that the techniques disclosed herein are broadly applicable to compressing information (e.g., branch information and predecode information) between different memories.

As is noted above, in variable length instruction set architectures (ISAs), e.g., an x86 ISA, instruction boundaries are variable. As such, instruction boundaries are usually unknown until an instruction is fetched and executed at least one time. After execution, instruction boundaries are known and may be saved. Predecode information, e.g., a predecode bit for each byte, may be saved to indicate where instruction boundaries occur in a fetch window. Thus, predecode information usually allows for speeding up decoding of instructions following initial execution of the instructions. As is also noted above, branch information may also be saved as instruction bytes are fetched and executed. The branch information may include: where branches are located in a fetch window; a branch type; and whether a branch is a direct branch or an indirect branch. If the branch is a direct branch, the branch information may include a branch offset or displacement, e.g., one, two, or four bytes. Whether a branch is always taken or never taken may also be saved in the branch information. The branch information may also include a conditional (dynamic) bit which indicates that an associated branch is sometimes taken and sometimes not taken. A branch predictor may then utilize the conditional bit to predict the outcome of an associated branch.

In one embodiment, a fetch window is set at 16-bytes. It should, however, be appreciated that the techniques disclosed herein are broadly application to fetch windows that are greater than or less than 16-bytes and the predecode and branch information may be increased or decreased accordingly. In at least portions of the discussion herein, a cache line and a fetch window are assumed to be the same length. It should, however, be appreciated that the techniques disclosed herein are applicable to fetch windows that encompass a complete cache line, a portion of a cache line, or multiple cache lines. According to one embodiment, an L1 cache stores branch information for up to three branches per fetch window, an L2 cache stores branch information for up to two branches per fetch window, and an L3 cache stores branch information for up to one branch per fetch window. According to this aspect of the present disclosure, the L3 cache is configured to store limited predecode information and branch information for up to one branch per fetch window. It should be appreciated that many fetch windows may only include one branch. In any case, maintaining branch information for one branch per fetch window in an L3 cache usually provides acceptable processor performance.

As noted above, a predecode bit may be employed for each instruction byte. In a fetch window of 16-bytes, sixteen predecode bits (one for each byte of the fetch window) may be stored in an L1 cache to track whether an instruction ends in any of the 16-bytes. An asserted predecode bit indicates that an associated byte corresponds to an end of an instruction. According to an aspect of the present disclosure, an L1 cache that utilizes a 16-byte fetch window may employ nine branch markers to indicate where branches end. In this case, nine buckets may be employed to track bytes 0-15 of a fetch window as follows: bucket 0 implements a branch marker for byte 0; bucket 1 implements a branch marker for bytes 1 and 2; bucket 2 implements a branch marker for bytes 3 and 4; bucket 3 implements a branch marker for bytes 5 and 6; bucket 4 implements a branch marker for bytes 7 and 8; bucket 5 implements a branch marker for bytes 9 and 10; bucket 6 implements a branch marker for bytes 11 and 12;

bucket 7 implements a branch marker for bytes 13 and 14; and bucket 8 implements a branch marker for byte 15.

Based on analysis of the predecode information, in conjunction with the branch markers, it can be readily determined at which byte a branch actually ends. In general, the disclosed cache compression schemes operate on the basis that most branches are 2-bytes or more. In one embodiment, no more than three of the buckets (one for each of up to three branches) may include a set branch marker bit for a fetch window in the L1 cache.

In one embodiment, the L1 cache stores sixteen bits of predecode information (one for each of sixteen instruction bytes) and a total of twenty-seven bits of branch information per fetch window. In this embodiment, nine bits are allocated to branch markers, twelve bits are allocated to storing four bits of branch information (see TABLE III) for each of up to three branches, three bits are allocated to storing conditional (dynamic) bits (which indicate whether a branch has exhibited conditional sometimes taken behavior for each of up to three branches), and three end bits are used to indicate whether a branch end occurs in a lower or upper byte of a bucket (one end bit for each of up to three branches). An asserted end bit indicates a branch ends in an upper byte of a bucket and a deasserted end bit indicates the branch ends in a lower byte of a bucket. The conditional bit for a branch may be stored explicitly in lower layers of cache (as in the two-branches in the L2 cache compressed to one-branch in the L3 cache case) or estimated based upon whether a branch type, provided in the branch information bits, is a conditional branch type (as in the one-branch in the L2 cache compressed to one-branch in the L3 cache case). The various predecode and branch information for an instruction may be stored in separate arrays that are correlated with a given fetch window or may be stored in the same cache line as an associated instruction.

The 16-bits of predecode information (which correspond to a fetch window of 16-bytes) stored in the L1 cache may be divided into two parts for compression, i.e., a first part corresponding to predecode bits zero to seven and a second part corresponding to predecode bits eight to fifteen. In the L2 cache, the predecode bits for each of the parts of the fetch window may be compressed separately such that 8-bits are compressed to 5-bits for each of the parts of the fetch window, which essentially provides a sixteen-to-ten compression. Alternatively, the fetch window may be divided into more or less than two parts, e.g., the entire predecode information of 16-bits may be directly compressed to 10-bits. In general, the compression scheme for the predecode bits in the L2 cache is based on employing a relatively simple decoder (within a decompressor) to decode one-byte and two-byte instructions. The simple decoder is employed in combination with partially marked predecode bits (i.e., the compressed decode bits). Thus, for predecode bits marked as 'x' in TABLE I, the simple decoder is utilized to decode the 'x' bytes to determine whether an instruction ends in one of the 'x' locations.

In the L2 cache, the 27-bits of branch information stored in the L1 cache are compressed to 8-bits of branch information. As noted above, the L1 cache stores branch information for up to three branches. According to another aspect of the present disclosure, an L2 cache compression scheme is implemented that stores branch markers and limited branch information (e.g., whether branches are dynamic) for each of two branches in a fetch window of the L1 cache or additional branch information (i.e., a branch type, a displacement, and whether the branch is dynamic) for one branch in a fetch window of the L1 cache. In either case, the 27-bits of L1 cache branch information are compressed into 8-bits of L2 cache branch information. An example 4-bit L1 cache branch information, maintained in the L1 cache for each of up to three branches per fetch window, is set forth below in TABLE III. In TABLE III, encodings 0-3 correspond to jump instructions, encodings 4-7 correspond to call instructions, encoding 8 corresponds to a return instruction, and encodings 9-15 are unused. It should be noted that, in at least one embodiment, the 4-bit L2 cache branch information is different than the 4-bit L1 cache branch information (see TABLES V-I through V-IX).

TABLE III

| Encoding | Branch Info | Branch Type (3-2) | Operand Size in Bytes (1-0) |
|---|---|---|---|
| 0 | 0000 | Jump | Indirect |
| 1 | 0001 | Jump | 1 |
| 2 | 0010 | Jump | 2 |
| 3 | 0011 | Jump | 4 |
| 4 | 0100 | Call | Indirect |
| 5 | 0101 | Call | 1 |
| 6 | 0110 | Call | 2 |
| 7 | 0111 | Call | 4 |
| 8 | 1000 | Return | N/A |
| 9 | 1001 | Unused (Return) | |
| 10 | 1010 | Unused (Return) | |
| 11 | 1011 | Unused (Return) | |
| 12 | 1100 | Unused (Return) | |
| 13 | 1101 | Unused (Return) | |
| 14 | 1110 | Unused (Return) | |
| 15 | 1111 | Unused (Return) | |

Example legal encodings for 8-bit L2 cache 2-branch encodings are set forth in TABLE IV. The encodings for the entries in TABLE IV range from: 9-15, 25-31, and 41-62 for branch 1 and branch 2 static (i.e., w=0 and v=0); 73-79, 89-95, and 105-126 for branch 1 dynamic and branch 2 static (i.e., w=1 and v=0); 137-143, 153-159, and 169-190 for branch 1 static and branch 2 dynamic (i.e., w=0 and v=1); and 201-207, 217-223, and 233-254 for branch 1 and branch 2 dynamic (i.e., w=1 and v=1). As is illustrated, the two-branch 8-bit L2 cache branch encodings provide complete branch markers for two branches and indicate whether the two branches are static (unconditional) or dynamic (conditional).

TABLE IV

| Encoding (7-0) | | Branch Markers | Branches | Branch 2 Dynamic (7) | Branch 1 Dynamic (6) |
|---|---|---|---|---|---|
| 9 + 64 (w) + 128 (v) | 96 | 001100000 | 2 | v | w |
| 10 + 64 (w) + 128 (v) | 3 | 000000011 | 2 | v | w |
| 11 + 64 (w) + 128 (v) | 5 | 000000101 | 2 | v | w |
| 12 + 64 (w) + 128 (v) | 9 | 000001001 | 2 | v | w |
| 13 + 64 (w) + 128 (v) | 17 | 000010001 | 2 | v | w |
| 14 + 64 (w) + 128 (v) | 33 | 000100001 | 2 | v | w |

TABLE IV-continued

| Encoding (7-0) | Branch Markers | | Branches | Branch 2 Dynamic (7) | Branch 1 Dynamic (6) |
|---|---|---|---|---|---|
| 15 + 64 (w) + 128 (v) | 65 | 001000001 | 2 | v | w |
| 25 + 64 (w) + 128 (v) | 12 | 000001100 | 2 | v | w |
| 26 + 64 (w) + 128 (v) | 20 | 000010100 | 2 | v | w |
| 27 + 64 (w) + 128 (v) | 36 | 000100100 | 2 | v | w |
| 28 + 64 (w) + 128 (v) | 68 | 001000100 | 2 | v | w |
| 29 + 64 (w) + 128 (v) | 132 | 010000100 | 2 | v | w |
| 30 + 64 (w) + 128 (v) | 260 | 100000100 | 2 | v | w |
| 31 + 64 (w) + 128 (v) | 24 | 000011000 | 2 | v | w |
| 41 + 64 (w) + 128 (v) | 72 | 001001000 | 2 | v | w |
| 42 + 64 (w) + 128 (v) | 136 | 010001000 | 2 | v | w |
| 43 + 64 (w) + 128 (v) | 264 | 100001000 | 2 | v | w |
| 44 + 64 (w) + 128 (v) | 48 | 000110000 | 2 | v | W |
| 45 + 64 (w) + 128 (v) | 80 | 001010000 | 2 | v | w |
| 46 + 64 (w) + 128 (v) | 144 | 010010000 | 2 | v | w |
| 47 + 64 (w) + 128 (v) | 272 | 100010000 | 2 | v | w |
| 48 + 64 (w) + 128 (v) | 258 | 100000010 | 2 | v | w |
| 49 + 64 (w) + 128 (v) | 257 | 100000001 | 2 | v | w |
| 50 + 64 (w) + 128 (v) | 6 | 000000110 | 2 | v | w |
| 51 + 64 (w) + 128 (v) | 10 | 000001010 | 2 | v | w |
| 52 + 64 (w) + 128 (v) | 18 | 000010010 | 2 | v | w |
| 53 + 64 (w) + 128 (v) | 34 | 000100010 | 2 | v | w |
| 54 + 64 (w) + 128 (v) | 66 | 001000010 | 2 | v | w |
| 55 + 64 (w) + 128 (v) | 130 | 010000010 | 2 | v | w |
| 56 + 64 (w) + 128 (v) | 40 | 000101000 | 2 | v | w |
| 57 + 64 (w) + 128 (v) | 160 | 010100000 | 2 | v | w |
| 58 + 64 (w) + 128 (v) | 288 | 100100000 | 2 | v | w |
| 59 + 64 (w) + 128 (v) | 192 | 011000000 | 2 | v | w |
| 60 + 64 (w) + 128 (v) | 320 | 101000000 | 2 | v | w |
| 61 + 64 (w) + 128 (v) | 384 | 110000000 | 2 | v | w |
| 62 + 64 (w) + 128 (v) | 129 | 010000001 | 2 | v | w |

Example legal encodings for 8-bit L2 cache 1-branch encodings are set forth in TABLES V-I through V-IX. The encodings for the entries in TABLES V-I through V-IX range from 0-8, 16-24, 32-40, 64-72, 80-88, 96-104, 128-136, 144-152, 160-168, 192-200, 208-216, and 224-232. As is illustrated in TABLES V-I through V-IX, the 8-bit L2 cache 1-branch encodings provide complete branch markers, 4-bits of L2 branch information, and indicate whether the single branch is static or dynamic. The 4-bits of L2 branch information indicate a branch type for the single branch, whether the single branch is an indirect or direct branch, and provide a displacement of the branch (in most cases) when the branch is a direct branch.

TABLE V-I

| | Encoding (7-0) | | Branch Markers | Branches | L2 Branch Info | L1 Branch Info | Branch Info Description | Dynamic |
|---|---|---|---|---|---|---|---|---|
| 0 | 00000000 | 1 | 000000001 | 1 | 0000 | 011X | Call, 2-byte or 4-byte Displacement | 0 |
| 1 | 00000001 | 2 | 000000010 | 1 | 0000 | 011X | Call, 2-byte or 4-byte Displacement | 0 |
| 2 | 00000010 | 4 | 000000100 | 1 | 0000 | 011X | Call, 2-byte or 4-byte Displacement | 0 |
| 3 | 00000011 | 8 | 000001000 | 1 | 0000 | 011X | Call, 2-byte or 4-byte Displacement | 0 |
| 4 | 00000100 | 16 | 000010000 | 1 | 0000 | 011X | Call, 2-byte or 4-byte Displacement | 0 |
| 5 | 00000101 | 32 | 000100000 | 1 | 0000 | 011X | Call, 2-byte or 4-byte Displacement | 0 |

TABLE V-I-continued

| | Encoding (7-0) | Branch Markers | Branches | L2 Branch Info | L1 Branch Info | Branch Info Description | Dynamic |
|---|---|---|---|---|---|---|---|
| 6 | 00000110 | 64 001000000 | 1 | 0000 | 011X | Call, 2-byte or 4-byte Displacement | 0 |
| 7 | 00000111 | 128 010000000 | 1 | 0000 | 011X | Call, 2-byte or 4-byte Displacement | 0 |
| 8 | 00001000 | 256 100000000 | 1 | 0000 | 011X | Call, 2-byte or 4-byte Displacement | 0 |

TABLE V-II

| | Encoding (7-0) | Branch Markers | Branches | L2 Branch Info | L1 Branch Info | Branch Info Description | Dynamic |
|---|---|---|---|---|---|---|---|
| 16 | 00010000 | 1 000000001 | 1 | 0100 | 0000 | Jump, Dynamic Indirect | 1 |
| 17 | 00010001 | 2 000000010 | 1 | 0100 | 0000 | Jump, Dynamic Indirect | 1 |
| 18 | 00010010 | 4 000000100 | 1 | 0100 | 0000 | Jump, Dynamic Indirect | 1 |
| 19 | 00010011 | 8 000001000 | 1 | 0100 | 0000 | Jump, Dynamic Indirect | 1 |
| 20 | 00010100 | 16 000010000 | 1 | 0100 | 0000 | Jump, Dynamic Indirect | 1 |
| 21 | 00010101 | 32 000100000 | 1 | 0100 | 0000 | Jump, Dynamic Indirect | 1 |
| 22 | 00010110 | 64 001000000 | 1 | 0100 | 0000 | Jump, Dynamic Indirect | 1 |
| 23 | 00010111 | 128 010000000 | 1 | 0100 | 0000 | Jump, Dynamic Indirect | 1 |
| 24 | 00011000 | 256 100000000 | 1 | 0100 | 0000 | Jump, Dynamic Indirect | 1 |
| 32 | 00100000 | 1 000000001 | 1 | 1000 | 0000 | Jump, Indirect | 0 |
| 33 | 00100001 | 2 000000010 | 1 | 1000 | 0000 | Jump, Indirect | 0 |
| 34 | 00100010 | 4 000000100 | 1 | 1000 | 0000 | Jump, Indirect | 0 |
| 35 | 00100011 | 8 000001000 | 1 | 1000 | 0000 | Jump, Indirect | 0 |
| 36 | 00100100 | 16 000010000 | 1 | 1000 | 0000 | Jump, Indirect | 0 |
| 37 | 00100101 | 32 000100000 | 1 | 1000 | 0000 | Jump, Indirect | 0 |
| 38 | 00100110 | 64 001000000 | 1 | 1000 | 0000 | Jump, Indirect | 0 |
| 39 | 00100111 | 128 010000000 | 1 | 1000 | 0000 | Jump, Indirect | 0 |
| 40 | 00101000 | 256 100000000 | 1 | 1000 | 0000 | Jump, Indirect | 0 |

TABLE V-III

| | Encoding (7-0) | Branch Markers | Branches | L2 Branch Info | L1 Branch Info | Branch Info Description | Dynamic |
|---|---|---|---|---|---|---|---|
| 64 | 01000000 | 1 000000001 | 1 | 0001 | 0100 | Call, Dynamic Indirect | 1 |
| 65 | 01000001 | 2 000000010 | 1 | 0001 | 0100 | Call, Dynamic Indirect | 1 |
| 66 | 01000010 | 4 000000100 | 1 | 0001 | 0100 | Call, Dynamic Indirect | 1 |
| 67 | 01000011 | 8 000001000 | 1 | 0001 | 0100 | Call, Dynamic Indirect | 1 |
| 68 | 01000100 | 16 000010000 | 1 | 0001 | 0100 | Call, Dynamic Indirect | 1 |

TABLE V-III-continued

| Encoding (7-0) | Branch Markers | | Branches | L2 Branch Info | L1 Branch Info | Branch Info Description | Dynamic |
|---|---|---|---|---|---|---|---|
| 69 01000101 | 32 | 000100000 | 1 | 0001 | 0100 | Call, Dynamic Indirect | 1 |
| 70 01000110 | 64 | 001000000 | 1 | 0001 | 0100 | Call, Dynamic Indirect | 1 |
| 71 01000111 | 128 | 010000000 | 1 | 0001 | 0100 | Call, Dynamic Indirect | 1 |
| 72 01001000 | 256 | 100000000 | 1 | 0001 | 0100 | Call, Dynamic Indirect | 1 |

TABLE V-IV

| Encoding (7-0) | Branch Markers | | Branches | L2 Branch Info | L1 Branch Info | Branch Info Description | Dynamic |
|---|---|---|---|---|---|---|---|
| 80 01010000 | 1 | 000000001 | 1 | 0101 | 0001 | Jump, Conditional, 1-byte Displacement | 1 |
| 81 01010001 | 2 | 000000010 | 1 | 0101 | 0001 | Jump, Conditional, 1-byte Displacement | 1 |
| 82 01010010 | 4 | 000000100 | 1 | 0101 | 0001 | Jump, Conditional, 1-byte Displacement | 1 |
| 83 01010011 | 8 | 000001000 | 1 | 0101 | 0001 | Jump, Conditional, 1-byte Displacement | 1 |
| 84 01010100 | 16 | 000010000 | 1 | 0101 | 0001 | Jump, Conditional, 1-byte Displacement | 1 |
| 85 01010101 | 32 | 000100000 | 1 | 0101 | 0001 | Jump, Conditional, 1-byte Displacement | 1 |
| 86 01010110 | 64 | 001000000 | 1 | 0101 | 0001 | Jump, Conditional, 1-byte Displacement | 1 |
| 87 01010111 | 128 | 010000000 | 1 | 0101 | 0001 | Jump, Conditional, 1-byte Displacement | 1 |
| 88 01011000 | 256 | 100000000 | 1 | 0101 | 0001 | Jump, Conditional, 1-byte Displacement | 1 |

TABLE V-V

| Encoding (7-0) | Branch Markers | | Branches | L2 Branch Info | L1 Branch Info | Branch Info Description | Dynamic |
|---|---|---|---|---|---|---|---|
| 96 01100000 | 1 | 000000001 | 1 | 1001 | 0001 | Jump, 1-byte Displacement | 0 |
| 97 01100001 | 2 | 000000010 | 1 | 1001 | 0001 | Jump, 1-byte Displacement | 0 |
| 98 01100010 | 4 | 000000100 | 1 | 1001 | 0001 | Jump, 1-byte Displacement | 0 |
| 99 01100011 | 8 | 000001000 | 1 | 1001 | 0001 | Jump, 1-byte Displacement | 0 |

TABLE V-V-continued

| Encoding (7-0) | | Branch Markers | | Branches | L2 Branch Info | L1 Branch Info | Branch Info Description | Dynamic |
|---|---|---|---|---|---|---|---|---|
| 100 | 01100100 | 16 | 000010000 | 1 | 1001 | 0001 | Jump, 1-byte Displacement | 0 |
| 101 | 01100101 | 32 | 000100000 | 1 | 1001 | 0001 | Jump, 1-byte Displacement | 0 |
| 102 | 01100110 | 64 | 001000000 | 1 | 1001 | 0001 | Jump, 1-byte Displacement | 0 |
| 103 | 01100111 | 128 | 010000000 | 1 | 1001 | 0001 | Jump, 1-byte Displacement | 0 |
| 104 | 01101000 | 256 | 100000000 | 1 | 1001 | 0001 | Jump, 1-byte Displacement | 0 |

TABLE V-VI

| Encoding (7-0) | | Branch Markers | | Branches | L2 Branch Info | L1 Branch Info | Branch Info Description | Dynamic |
|---|---|---|---|---|---|---|---|---|
| 128 | 10000000 | 1 | 000000001 | 1 | 0010 | 0100 | Call, Indirect | 0 |
| 129 | 10000001 | 2 | 000000010 | 1 | 0010 | 0100 | Call, Indirect | 0 |
| 130 | 10000010 | 4 | 000000100 | 1 | 0010 | 0100 | Call, Indirect | 0 |
| 131 | 10000011 | 8 | 000001000 | 1 | 0010 | 0100 | Call, Indirect | 0 |
| 132 | 10000100 | 16 | 000010000 | 1 | 0010 | 0100 | Call, Indirect | 0 |
| 133 | 10000101 | 32 | 000100000 | 1 | 0010 | 0100 | Call, Indirect | 0 |
| 134 | 10000110 | 64 | 001000000 | 1 | 0010 | 0100 | Call, Indirect | 0 |
| 135 | 10000111 | 128 | 010000000 | 1 | 0010 | 0100 | Call, Indirect | 0 |
| 136 | 10001000 | 256 | 100000000 | 1 | 0010 | 0100 | Call, Indirect | 0 |

TABLE V-VII

| Encoding (7-0) | | Branch Markers | | Branches | L2 Branch Info | L1 Branch Info | Branch Info Description | Dynamic |
|---|---|---|---|---|---|---|---|---|
| 144 | 10010000 | 1 | 000000001 | 1 | 0110 | 0010 | Jump, Conditional, 2-byte Displacement | 1 |
| 145 | 10010001 | 2 | 000000010 | 1 | 0110 | 0010 | Jump, Conditional, 2-byte Displacement | 1 |
| 146 | 10010010 | 4 | 000000100 | 1 | 0110 | 0010 | Jump, Conditional, 2-byte Displacement | 1 |
| 147 | 10010011 | 8 | 000001000 | 1 | 0110 | 0010 | Jump, Conditional, 2-byte Displacement | 1 |
| 148 | 10010100 | 16 | 000010000 | 1 | 0110 | 0010 | Jump, Conditional, 2-byte Displacement | 1 |
| 149 | 10010101 | 32 | 000100000 | 1 | 0110 | 0010 | Jump, Conditional, 2-byte Displacement | 1 |
| 150 | 10010110 | 64 | 001000000 | 1 | 0110 | 0010 | Jump, Conditional, 2-byte Displacement | 1 |
| 151 | 10010111 | 128 | 010000000 | 1 | 0110 | 0010 | Jump, Conditional, 2-byte Displacement | 1 |
| 152 | 10011000 | 256 | 100000000 | 1 | 0110 | 0010 | Jump, Conditional, 2-byte Displacement | 1 |

TABLE V-VII-continued

| | Encoding (7-0) | | Branch Markers | Branches | L2 Branch Info | L1 Branch Info | Branch Info Description | Dynamic |
|---|---|---|---|---|---|---|---|---|
| 160 | 10100000 | 1 | 000000001 | 1 | 1010 | 0010 | Jump, 2-byte Displacement | 0 |
| 161 | 10100001 | 2 | 000000010 | 1 | 1010 | 0010 | Jump, 2-byte Displacement | 0 |
| 162 | 10100010 | 4 | 000000100 | 1 | 1010 | 0010 | Jump, 2-byte Displacement | 0 |
| 163 | 10100011 | 8 | 000001000 | 1 | 1010 | 0010 | Jump, 2-byte Displacement | 0 |
| 164 | 10100100 | 16 | 000010000 | 1 | 1010 | 0010 | Jump, 2-byte Displacement | 0 |
| 165 | 10100101 | 32 | 000100000 | 1 | 1010 | 0010 | Jump, 2-byte Displacement | 0 |
| 166 | 10100110 | 64 | 001000000 | 1 | 1010 | 0010 | Jump, 2-byte Displacement | 0 |
| 167 | 10100111 | 128 | 010000000 | 1 | 1010 | 0010 | Jump, 2-byte Displacement | 0 |
| 168 | 10101000 | 256 | 100000000 | 1 | 1010 | 0010 | Jump, 2-byte Displacement | 0 |

TABLE V-VIII

| | Encoding (7-0) | | Branch Markers | Branches | L2 Branch Info | L1 Branch Info | Branch Info Description | Dynamic |
|---|---|---|---|---|---|---|---|---|
| 192 | 11000000 | 1 | 000000001 | 1 | 0011 | 1000 | Return | 0 |
| 193 | 11000001 | 2 | 000000010 | 1 | 0011 | 1000 | Return | 0 |
| 194 | 11000010 | 4 | 000000100 | 1 | 0011 | 1000 | Return | 0 |
| 195 | 11000011 | 8 | 000001000 | 1 | 0011 | 1000 | Return | 0 |
| 196 | 11000100 | 16 | 000010000 | 1 | 0011 | 1000 | Return | 0 |
| 197 | 11000101 | 32 | 000100000 | 1 | 0011 | 1000 | Return | 0 |
| 198 | 11000110 | 64 | 001000000 | 1 | 0011 | 1000 | Return | 0 |
| 199 | 11000111 | 128 | 010000000 | 1 | 0011 | 1000 | Return | 0 |
| 200 | 11001000 | 256 | 100000000 | 1 | 0011 | 1000 | Return | 0 |

TABLE V-IX

| | Encoding (7-0) | | Branch Markers | Branches | L2 Branch Info | L1 Branch Info | Branch Info Description | Dynamic |
|---|---|---|---|---|---|---|---|---|
| 208 | 11010000 | 1 | 000000001 | 1 | 0111 | 0011 | Jump, Conditional, 4-byte Displacement | 1 |
| 209 | 11010001 | 2 | 000000010 | 1 | 0111 | 0011 | Jump, Conditional, 4-byte Displacement | 1 |
| 210 | 11010010 | 4 | 000000100 | 1 | 0111 | 0011 | Jump, Conditional, 4-byte Displacement | 1 |
| 211 | 11010011 | 8 | 000001000 | 1 | 0111 | 0011 | Jump, Conditional, 4-byte Displacement | 1 |
| 212 | 11010100 | 16 | 000010000 | 1 | 0111 | 0011 | Jump, Conditional, 4-byte Displacement | 1 |
| 213 | 11010101 | 32 | 000100000 | 1 | 0111 | 0011 | Jump, Conditional, 4-byte Displacement | 1 |
| 214 | 11010110 | 64 | 001000000 | 1 | 0111 | 0011 | Jump, Conditional, 4-byte Displacement | 1 |

TABLE V-IX-continued

| Encoding (7-0) | | Branch Markers | Branches | L2 Branch Info | L1 Branch Info | Branch Info Description | Dynamic |
|---|---|---|---|---|---|---|---|
| 215 | 11010111 | 128 010000000 | 1 | 0111 | 0011 | Jump, Conditional, 4-byte Displacement | 1 |
| 216 | 11011000 | 256 100000000 | 1 | 0111 | 0011 | Jump, Conditional, 4-byte Displacement | 1 |
| 224 | 11100000 | 1 000000001 | 1 | 1011 | 0011 | Jump, 4-byte Displacement | 0 |
| 225 | 11100001 | 2 000000010 | 1 | 1011 | 0011 | Jump, 4-byte Displacement | 0 |
| 226 | 11100010 | 4 000000100 | 1 | 1011 | 0011 | Jump, 4-byte Displacement | 0 |
| 227 | 11100011 | 8 000001000 | 1 | 1011 | 0011 | Jump, 4-byte Displacement | 0 |
| 228 | 11100100 | 16 000010000 | 1 | 1011 | 0011 | Jump, 4-byte Displacement | 0 |
| 229 | 11100101 | 32 000100000 | 1 | 1011 | 0011 | Jump, 4-byte Displacement | 0 |
| 230 | 11100110 | 64 001000000 | 1 | 1011 | 0011 | Jump, 4-byte Displacement | 0 |
| 231 | 11100111 | 128 010000000 | 1 | 1011 | 0011 | Jump, 4-byte Displacement | 0 |
| 232 | 11101000 | 256 100000000 | 1 | 1011 | 0011 | Jump, 4-byte Displacement | 0 |

In the example L3 compression scheme, the 10-bits of predecode information and the 8-bits of branch information stored in the L2 cache are further compressed to a total of 10-bits. In the example L2 compression scheme there are basically two separate encodings, i.e., a first encoding for two branches and a second encoding for one branch. The second encoding includes more information about a particular branch than the first encoding. In general, the L3 compression scheme takes advantage of the way predecode information is compressed, i.e., assuming an instruction end is known one-byte and two-byte instructions may be decoded to determine where a branch ends. The L3 compression scheme is similar to the L2 compression scheme. The L3 compression scheme relies on knowing where an instruction before a branch ends and where the branch ends. In the L3 compression scheme, a branch that is the first instruction ending in the fetch window is not allowed, as logic to determine whether a branch started in a previous fetch window is not employed. It should, however, be appreciated that logic may be designed to determine where a branch started in a previous fetch window and, in this case, a branch may be the first instruction ending in a fetch window. However, according to at least one embodiment, a branch cannot be the first instruction ending in a fetch window. In this embodiment, if a branch ends in a first byte of a fetch window, the branch is dropped and if there are multiple branches in the fetch window a next branch is encoded. If the branch that ends in the first byte of the fetch window is the only branch in the fetch window, then the branch is dropped and no branches are encoded for the fetch window.

Example legal encodings for compressing two branches in an L2 cache to one branch in an L3 cache are set forth in TABLES VI-I through VI-IV. The encodings for the entries in TABLES VI-I through VI-IV range from 256 to 364 for a dynamic (conditional) bit equal to zero (y=0) and from 384 to 492 for a dynamic (conditional) bit equal to one (y=1). The encodings in TABLES VI-I through VI-IV indicate the number of branches in a fetch window of the L2 cache (bits 9-8), whether the single branch stored in the L3 cache encoding is dynamic, what bucket a branch ends end and corresponding predecode bits (where "X" indicates a bit that requires a simple decoder to determine whether an instruction ends in an associated byte).

TABLE VI-I

| | | | Branch Bucket | | | | | | | | | | | | | | | | | | | |
|---|---|---|---|---|---|---|---|---|---|---|---|---|---|---|---|---|---|---|---|---|---|---|
| | | | 0 | 1 | | 2 | | 3 | | 4 | | 5 | | 6 | | 7 | | 8 | | | | |
| | | | Instruction Byte | | | | | | | | | | | | | | | | | | | | |
| Encoding (9-0) | Branches in L2 (9-8) | Dynamic (7) | 0 | 1 | 2 | 3 | 4 | 5 | 6 | 7 | 8 | 9 | 10 | 11 | 12 | 13 | 14 | 15 | Branch Ends in Bucket | | | |
| | | | | | | | | | | Compressed End Bits (6-0) | | | | | | | | | | | | |
| 256 + (y)128 | 2 | y | 1 | X | X | 0 | 0 | 0 | 0 | 0 | 0 | 0 | 0 | 0 | 0 | 0 | 0 | 0 | 1 | | | |
| 257 + (y)128 | 2 | y | 0 | 1 | X | X | 0 | 0 | 0 | 0 | 0 | 0 | 0 | 0 | 0 | 0 | 0 | 0 | 1 | | | |
| 258 + (y)128 | 2 | y | 0 | 0 | 1 | X | X | 0 | 0 | 0 | 0 | 0 | 0 | 0 | 0 | 0 | 0 | 0 | 2 | | | |
| 259 + (y)128 | 2 | y | 0 | 0 | 0 | 1 | X | X | 0 | 0 | 0 | 0 | 0 | 0 | 0 | 0 | 0 | 0 | 2 | | | |
| 260 + (y)128 | 2 | y | 1 | X | X | 1 | X | X | 0 | 0 | 0 | 0 | 0 | 0 | 0 | 0 | 0 | 0 | 2 | | | |

TABLE VI-I-continued

| | | | Branch Bucket | | | | | | | | | | | | | | | | | | | | | | |
|---|---|---|---|---|---|---|---|---|---|---|---|---|---|---|---|---|---|---|---|---|---|---|---|---|---|
| | | | 0 | 1 | | 2 | | 3 | 4 | | 5 | | 6 | | 7 | | 8 | | | | | | | | |
| | | | | | | | | | Instruction Byte | | | | | | | | | | | | | | | | |
| | | | 0 | 1 | 2 | 3 | 4 | 5 | 6 | 7 | 8 | 9 | 10 | 11 | 12 | 13 | 14 | 15 | | | | | | | |
| Encoding (9-0) | Branches in L2 (9-8) | Dynamic (7) | | | | | | | Compressed End Bits (6-0) | | | | | | | | | | | | | | | | Branch Ends in Bucket |
| 261 + (y)128 | 2 | y | 1 | X | X | 0 | 1 | X | X | 0 | 0 | 0 | 0 | 0 | 0 | 0 | 0 | 0 | 2 |
| 262 + (y)128 | 2 | y | 0 | 1 | X | X | 1 | X | X | 0 | 0 | 0 | 0 | 0 | 0 | 0 | 0 | 0 | 2 |
| 263 + (y)128 | 2 | y | 0 | 0 | 0 | 0 | 1 | X | X | 0 | 0 | 0 | 0 | 0 | 0 | 0 | 0 | 0 | 3 |
| 264 + (y)128 | 2 | y | 0 | 0 | 0 | 0 | 0 | 1 | X | X | 0 | 0 | 0 | 0 | 0 | 0 | 0 | 0 | 3 |
| 265 + (y)128 | 2 | y | 1 | X | X | 0 | 0 | 1 | X | X | 0 | 0 | 0 | 0 | 0 | 0 | 0 | 0 | 3 |
| 266 + (y)128 | 2 | y | 0 | 1 | X | X | 0 | 1 | X | X | 0 | 0 | 0 | 0 | 0 | 0 | 0 | 0 | 3 |
| 267 + (y)128 | 2 | y | 0 | 0 | 1 | X | X | 1 | X | X | 0 | 0 | 0 | 0 | 0 | 0 | 0 | 0 | 3 |
| 268 + (y)128 | 2 | y | 1 | X | X | 0 | 0 | 0 | 1 | X | 0 | 0 | 0 | 0 | 0 | 0 | 0 | 0 | 3 |
| 269 + (y)128 | 2 | y | 0 | 1 | X | X | 0 | 0 | 1 | X | 0 | 0 | 0 | 0 | 0 | 0 | 0 | 0 | 3 |
| 270 + (y)128 | 2 | y | 0 | 0 | 1 | X | X | 0 | 1 | X | 0 | 0 | 0 | 0 | 0 | 0 | 0 | 0 | 3 |
| 271 + (y)128 | 2 | y | 0 | 0 | 0 | 1 | X | X | 1 | X | 0 | 0 | 0 | 0 | 0 | 0 | 0 | 0 | 3 |
| 272 + (y)128 | 2 | y | 0 | 0 | 0 | 0 | 0 | 0 | 1 | X | 0 | 0 | 0 | 0 | 0 | 0 | 0 | 0 | 4 |
| 273 + (y)128 | 2 | y | 1 | X | X | 0 | 0 | 0 | 0 | 1 | 0 | 0 | 0 | 0 | 0 | 0 | 0 | 0 | 4 |
| 274 + (y)128 | 2 | y | 0 | 1 | X | X | 0 | 0 | 0 | 1 | 0 | 0 | 0 | 0 | 0 | 0 | 0 | 0 | 4 |
| 275 + (y)128 | 2 | y | 0 | 0 | 1 | X | X | 0 | 0 | 1 | 0 | 0 | 0 | 0 | 0 | 0 | 0 | 0 | 4 |
| 276 + (y)128 | 2 | y | 0 | 0 | 0 | 1 | X | X | 0 | 1 | 0 | 0 | 0 | 0 | 0 | 0 | 0 | 0 | 4 |
| 277 + (y)128 | 2 | y | 0 | 0 | 0 | 0 | 1 | X | X | 1 | 0 | 0 | 0 | 0 | 0 | 0 | 0 | 0 | 4 |
| 278 + (y)128 | 2 | y | 1 | X | X | 0 | 0 | 0 | 0 | 1 | X | X | 0 | 0 | 0 | 0 | 0 | 0 | 4 |
| 279 + (y)128 | 2 | y | 0 | 1 | X | X | 0 | 0 | 0 | 1 | X | X | 0 | 0 | 0 | 0 | 0 | 0 | 4 |
| 280 + (y)128 | 2 | y | 0 | 0 | 1 | X | X | 0 | 0 | 1 | X | X | 0 | 0 | 0 | 0 | 0 | 0 | 4 |
| 281 + (y)128 | 2 | y | 0 | 0 | 0 | 1 | X | X | 0 | 1 | X | X | 0 | 0 | 0 | 0 | 0 | 0 | 4 |
| 282 + (y)128 | 2 | y | 0 | 0 | 0 | 0 | 1 | X | X | 1 | X | X | 0 | 0 | 0 | 0 | 0 | 0 | 4 |
| 283 + (y)128 | 2 | y | 0 | 0 | 0 | 0 | 0 | 1 | X | 1 | X | X | 0 | 0 | 0 | 0 | 0 | 0 | 4 |
| 284 + (y)128 | 2 | y | 0 | 0 | 0 | 0 | 0 | 0 | 1 | 1 | X | X | 0 | 0 | 0 | 0 | 0 | 0 | 4 |
| 285 + (y)128 | 2 | y | 0 | 0 | 0 | 0 | 0 | 0 | 0 | 1 | 1 | X | X | 0 | 0 | 0 | 0 | 0 | 4 |

TABLE VI-II

| | | | Branch Bucket | | | | | | | | | | | | | | | | | | | | | | |
|---|---|---|---|---|---|---|---|---|---|---|---|---|---|---|---|---|---|---|---|---|---|---|---|---|---|
| | | | 0 | 1 | | 2 | | 3 | 4 | | 5 | | 6 | | 7 | | 8 | | | | | | | | |
| | | | | | | | | | Instruction Byte | | | | | | | | | | | | | | | | |
| | | | 0 | 1 | 2 | 3 | 4 | 5 | 6 | 7 | 8 | 9 | 10 | 11 | 12 | 13 | 14 | 15 | | | | | | | |
| Encoding (9-0) | Branches in L2 (9-8) | Dynamic (7) | | | | | | | Compressed End Bits (6.0) | | | | | | | | | | | | | | | | Branch Ends in Bucket |
| 286 + (y)128 | 2 | y | 0 | 0 | 0 | 0 | 0 | 0 | 0 | 0 | 1 | X | X | 0 | 0 | 0 | 0 | 0 | 5 |
| 287 + (y)128 | 2 | y | 0 | 0 | 0 | 0 | 0 | 0 | 0 | 0 | 0 | 1 | X | X | 0 | 0 | 0 | 0 | 5 |
| 288 + (y)128 | 2 | y | 1 | X | X | 0 | 0 | 0 | 0 | 0 | 0 | 1 | X | X | 0 | 0 | 0 | 0 | 5 |
| 289 + (y)128 | 2 | y | 0 | 1 | X | X | 0 | 0 | 0 | 0 | 0 | 1 | X | X | 0 | 0 | 0 | 0 | 5 |
| 290 + (y)128 | 2 | y | 0 | 0 | 1 | X | X | 0 | 0 | 0 | 0 | 1 | X | X | 0 | 0 | 0 | 0 | 5 |
| 291 + (y)128 | 2 | y | 0 | 0 | 0 | 1 | X | X | 0 | 0 | 0 | 1 | X | X | 0 | 0 | 0 | 0 | 5 |
| 292 + (y)128 | 2 | y | 0 | 0 | 0 | 0 | 1 | X | X | 0 | 0 | 1 | X | X | 0 | 0 | 0 | 0 | 5 |
| 293 + (y)128 | 2 | y | 0 | 0 | 0 | 0 | 0 | 1 | X | X | 0 | 1 | X | X | 0 | 0 | 0 | 0 | 5 |
| 294 + (y)128 | 2 | y | 0 | 0 | 0 | 0 | 0 | 0 | 1 | X | 0 | 1 | X | X | 0 | 0 | 0 | 0 | 5 |
| 295 + (y)128 | 2 | y | 0 | 0 | 0 | 0 | 0 | 0 | 0 | 1 | 0 | 1 | X | X | 0 | 0 | 0 | 0 | 5 |
| 296 + (y)128 | 2 | y | 1 | X | X | 0 | 0 | 0 | 0 | 0 | 0 | 0 | 1 | X | X | 0 | 0 | 0 | 5 |
| 297 + (y)128 | 2 | y | 0 | 1 | X | X | 0 | 0 | 0 | 0 | 0 | 0 | 1 | X | X | 0 | 0 | 0 | 5 |
| 298 + (y)128 | 2 | y | 0 | 0 | 1 | X | X | 0 | 0 | 0 | 0 | 0 | 1 | X | X | 0 | 0 | 0 | 5 |
| 299 + (y)128 | 2 | y | 0 | 0 | 0 | 1 | X | X | 0 | 0 | 0 | 0 | 1 | X | X | 0 | 0 | 0 | 5 |
| 300 + (y)128 | 2 | y | 0 | 0 | 0 | 0 | 1 | X | X | 0 | 0 | 0 | 1 | X | X | 0 | 0 | 0 | 5 |
| 301 + (y)128 | 2 | y | 0 | 0 | 0 | 0 | 0 | 1 | X | X | 0 | 0 | 1 | X | X | 0 | 0 | 0 | 5 |
| 302 + (y)128 | 2 | y | 0 | 0 | 0 | 0 | 0 | 0 | 1 | X | 0 | 0 | 1 | X | X | 0 | 0 | 0 | 5 |
| 303 + (y)128 | 2 | y | 0 | 0 | 0 | 0 | 0 | 0 | 0 | 1 | 0 | 0 | 1 | X | X | 0 | 0 | 0 | 5 |
| 304 + (y)128 | 2 | y | 0 | 0 | 0 | 0 | 0 | 0 | 0 | 0 | 0 | 0 | 1 | X | X | 0 | 0 | 0 | 6 |
| 305 + (y)128 | 2 | y | 0 | 0 | 0 | 0 | 0 | 0 | 0 | 0 | 0 | 0 | 0 | 1 | X | X | 0 | 0 | 6 |
| 306 + (y)128 | 2 | y | 1 | X | X | 0 | 0 | 0 | 0 | 0 | 0 | 0 | 0 | 1 | X | X | 0 | 0 | 6 |
| 307 + (y)128 | 2 | y | 0 | 1 | X | X | 0 | 0 | 0 | 0 | 0 | 0 | 0 | 1 | X | X | 0 | 0 | 6 |
| 308 + (y)128 | 2 | y | 0 | 0 | 1 | X | X | 0 | 0 | 0 | 0 | 0 | 0 | 1 | X | X | 0 | 0 | 6 |
| 309 + (y)128 | 2 | y | 0 | 0 | 0 | 1 | X | X | 0 | 0 | 0 | 0 | 0 | 1 | X | X | 0 | 0 | 6 |
| 310 + (y)128 | 2 | y | 0 | 0 | 0 | 0 | 1 | X | X | 0 | 0 | 0 | 0 | 1 | X | X | 0 | 0 | 6 |
| 311 + (y)128 | 2 | y | 0 | 0 | 0 | 0 | 0 | 1 | X | X | 0 | 0 | 0 | 1 | X | X | 0 | 0 | 6 |
| 312 + (y)128 | 2 | y | 0 | 0 | 0 | 0 | 0 | 0 | 1 | X | 0 | 0 | 0 | 1 | X | X | 0 | 0 | 6 |
| 313 + (y)128 | 2 | y | 0 | 0 | 0 | 0 | 0 | 0 | 0 | 1 | 0 | 0 | 0 | 1 | X | X | 0 | 0 | 6 |

TABLE VI-II-continued

| | | | Branch Bucket | | | | | | | | | | | | | | | | | | |
|---|---|---|---|---|---|---|---|---|---|---|---|---|---|---|---|---|---|---|---|---|---|
| | | | 0 | 1 | | 2 | | 3 | 4 | | 5 | | 6 | | 7 | | 8 | | | |
| | | | | | | | | | Instruction Byte | | | | | | | | | | | |
| | | | 0 | 1 | 2 | 3 | 4 | 5 | 6 | 7 | 8 | 9 | 10 | 11 | 12 | 13 | 14 | 15 | | |
| Encoding (9-0) | Branches in L2 (9-8) | Dynamic (7) | | | | | | | Compressed End Bits (6.0) | | | | | | | | | | | Branch Ends in Bucket |
| 314 + (y)128 | 2 | y | 0 | 0 | 0 | 0 | 0 | 0 | 0 | 0 | 1 | X | X | 1 | X | X | 0 | 0 | 6 |
| 315 + (y)128 | 2 | y | 1 | X | X | 0 | 0 | 0 | 0 | 0 | 0 | 0 | 0 | 1 | X | X | 0 | 0 | 6 |
| 316 + (y)128 | 2 | y | 0 | 1 | X | X | 0 | 0 | 0 | 0 | 0 | 0 | 0 | 1 | X | X | 0 | 0 | 6 |
| 317 + (y)128 | 2 | y | 0 | 0 | 1 | X | X | 0 | 0 | 0 | 0 | 0 | 0 | 1 | X | X | 0 | 0 | 6 |
| 318 + (y)128 | 2 | y | 0 | 0 | 0 | 1 | X | X | 0 | 0 | 0 | 0 | 0 | 1 | X | X | 0 | 0 | 6 |
| 319 + (y)128 | 2 | y | 0 | 0 | 0 | 0 | 1 | X | X | 0 | 0 | 0 | 0 | 1 | X | X | 0 | 0 | 6 |
| 320 + (y)128 | 2 | y | 0 | 0 | 0 | 0 | 0 | 1 | X | X | 0 | 0 | 0 | 1 | X | X | 0 | 0 | 6 |
| 321 + (y)128 | 2 | y | 0 | 0 | 0 | 0 | 0 | 0 | 1 | X | 0 | 0 | 0 | 1 | X | X | 0 | 0 | 6 |
| 322 + (y)128 | 2 | y | 0 | 0 | 0 | 0 | 0 | 0 | 0 | 1 | 0 | 0 | 0 | 1 | X | X | 0 | 0 | 6 |
| 323 + (y)128 | 2 | y | 0 | 0 | 0 | 0 | 0 | 0 | 0 | 0 | 1 | X | X | 0 | 1 | X | X | 0 | 6 |
| 324 + (y)128 | 2 | y | 0 | 0 | 0 | 0 | 0 | 0 | 0 | 0 | 0 | 1 | X | X | 1 | X | X | 0 | 6 |

TABLE VI-III

| | | | Branch Bucket | | | | | | | | | | | | | | | | | | |
|---|---|---|---|---|---|---|---|---|---|---|---|---|---|---|---|---|---|---|---|---|---|
| | | | 0 | 1 | | 2 | | 3 | 4 | | 5 | | 6 | | 7 | | 8 | | | |
| | | | | | | | | | Instruction Byte | | | | | | | | | | | |
| | | | 0 | 1 | 2 | 3 | 4 | 5 | 6 | 7 | 8 | 9 | 10 | 11 | 12 | 13 | 14 | 15 | | |
| Encoding (9-0) | Branches in L2 (9-8) | Dynamic (7) | | | | | | | Compressed End Bits (6.0) | | | | | | | | | | | Branch Ends in Bucket |
| 325 + (y)128 | 2 | y | 0 | 0 | 0 | 0 | 0 | 0 | 0 | 0 | 0 | 0 | 0 | 1 | X | X | 0 | | 7 |
| 326 + (y)128 | 2 | y | 0 | 0 | 0 | 0 | 0 | 0 | 0 | 0 | 0 | 0 | 0 | 0 | 1 | X | X | | 7 |
| 327 + (y)128 | 2 | y | 1 | X | X | 0 | 0 | 0 | 0 | 0 | 0 | 0 | 0 | 0 | 1 | X | X | | 7 |
| 328 + (y)128 | 2 | y | 0 | 1 | X | X | 0 | 0 | 0 | 0 | 0 | 0 | 0 | 0 | 1 | X | X | | 7 |
| 329 + (y)128 | 2 | y | 0 | 0 | 1 | X | X | 0 | 0 | 0 | 0 | 0 | 0 | 0 | 1 | X | X | | 7 |
| 330 + (y)128 | 2 | y | 0 | 0 | 0 | 1 | X | X | 0 | 0 | 0 | 0 | 0 | 0 | 1 | X | X | | 7 |
| 331 + (y)128 | 2 | y | 0 | 0 | 0 | 0 | 1 | X | X | 0 | 0 | 0 | 0 | 0 | 1 | X | X | | 7 |
| 332 + (y)128 | 2 | y | 0 | 0 | 0 | 0 | 0 | 1 | X | X | 0 | 0 | 0 | 0 | 1 | X | X | | 7 |
| 333 + (y)128 | 2 | y | 0 | 0 | 0 | 0 | 0 | 0 | 1 | X | 0 | 0 | 0 | 0 | 1 | X | X | | 7 |
| 334 + (y)128 | 2 | y | 0 | 0 | 0 | 0 | 0 | 0 | 0 | 1 | 0 | 0 | 0 | 0 | 1 | X | X | | 7 |
| 335 + (y)128 | 2 | y | 0 | 0 | 0 | 0 | 0 | 0 | 0 | 0 | 1 | X | X | 0 | 1 | X | X | | 7 |
| 336 + (y)128 | 2 | y | 0 | 0 | 0 | 0 | 0 | 0 | 0 | 0 | 0 | 1 | X | X | 1 | X | 0 | | 7 |
| 337 + (y)128 | 2 | y | 0 | 0 | 0 | 0 | 0 | 0 | 0 | 0 | 0 | 0 | 1 | X | X | 1 | X | X | 7 |
| 338 + (y)128 | 2 | y | 1 | X | X | 0 | 0 | 0 | 0 | 0 | 0 | 0 | 0 | 0 | 0 | 1 | X | | 7 |
| 339 + (y)128 | 2 | y | 0 | 1 | X | X | 0 | 0 | 0 | 0 | 0 | 0 | 0 | 0 | 0 | 1 | X | | 7 |
| 340 + (y)128 | 2 | y | 0 | 0 | 1 | X | X | 0 | 0 | 0 | 0 | 0 | 0 | 0 | 0 | 1 | X | | 7 |
| 341 + (y)128 | 2 | y | 0 | 0 | 0 | 1 | X | X | 0 | 0 | 0 | 0 | 0 | 0 | 0 | 1 | X | | 7 |
| 342 + (y)128 | 2 | y | 0 | 0 | 0 | 0 | 1 | X | X | 0 | 0 | 0 | 0 | 0 | 0 | 1 | X | | 7 |
| 343 + (y)128 | 2 | y | 0 | 0 | 0 | 0 | 0 | 1 | X | X | 0 | 0 | 0 | 0 | 0 | 1 | X | | 7 |
| 344 + (y)128 | 2 | y | 0 | 0 | 0 | 0 | 0 | 0 | 1 | X | 0 | 0 | 0 | 0 | 0 | 1 | X | | 7 |
| 345 + (y)128 | 2 | y | 0 | 0 | 0 | 0 | 0 | 0 | 0 | 1 | 0 | 0 | 0 | 0 | 0 | 1 | X | | 7 |
| 346 + (y)128 | 2 | y | 0 | 0 | 0 | 0 | 0 | 0 | 0 | 0 | 1 | X | X | 0 | 0 | 1 | X | | 7 |
| 347 + (y)128 | 2 | y | 0 | 0 | 0 | 0 | 0 | 0 | 0 | 0 | 0 | 1 | X | X | 0 | 1 | X | | 7 |
| 348 + (y)128 | 2 | y | 0 | 0 | 0 | 0 | 0 | 0 | 0 | 0 | 0 | 0 | 1 | X | X | 1 | X | | 7 |
| 349 + (y)128 | 2 | y | 0 | 0 | 0 | 0 | 0 | 0 | 0 | 0 | 0 | 0 | 0 | 1 | X | X | 1 | X | 7 |

TABLE VI-IV

| | | | Branch Bucket | | | | | | | | | | | | | | | | | | |
|---|---|---|---|---|---|---|---|---|---|---|---|---|---|---|---|---|---|---|---|---|---|
| | | | 0 | 1 | | 2 | | 3 | 4 | | 5 | | 6 | | 7 | | 8 | | | |
| | | | | | | | | | Instruction Byte | | | | | | | | | | | |
| | | | 0 | 1 | 2 | 3 | 4 | 5 | 6 | 7 | 8 | 9 | 10 | 11 | 12 | 13 | 14 | 15 | | |
| Encoding (9-0) | Branches in L2 (9-8) | Dynamic (7) | | | | | | | Compressed End Bits (6.0) | | | | | | | | | | | Branch Ends in Bucket |
| 350 + (y)128 | 2 | y | 0 | 0 | 0 | 0 | 0 | 0 | 0 | 0 | 0 | 0 | 0 | 0 | 1 | X | X | | 8 |
| 351 + (y)128 | 2 | y | 0 | 0 | 0 | 0 | 0 | 0 | 0 | 0 | 0 | 0 | 0 | 0 | 0 | 1 | X | | 8 |

TABLE VI-IV-continued

| | | | Branch Bucket | | | | | | | | | | | | | | | | | | | | |
|---|---|---|---|---|---|---|---|---|---|---|---|---|---|---|---|---|---|---|---|---|---|---|---|
| | | | 0 | 1 | | 2 | | 3 | | 4 | | 5 | | 6 | | 7 | | 8 | | | |
| | | | | | | | | | | Instruction Byte | | | | | | | | | | | |
| | | | 0 | 1 | 2 | 3 | 4 | 5 | 6 | 7 | 8 | 9 | 10 | 11 | 12 | 13 | 14 | 15 | | |
| Encoding (9-0) | Branches in L2 (9-8) | Dynamic (7) | | | | | | | | Compressed End Bits (6.0) | | | | | | | | | | Branch Ends in Bucket |
| 352 + (y)128 | 2 | y | 1 | X | X | 0 | 0 | 0 | 0 | 0 | 0 | 0 | 0 | 0 | 0 | 0 | 0 | 1 | 8 |
| 353 + (y)128 | 2 | y | 0 | 1 | X | X | 0 | 0 | 0 | 0 | 0 | 0 | 0 | 0 | 0 | 0 | 0 | 1 | 8 |
| 354 + (y)128 | 2 | y | 0 | 0 | 1 | X | X | 0 | 0 | 0 | 0 | 0 | 0 | 0 | 0 | 0 | 0 | 1 | 8 |
| 355 + (y)128 | 2 | y | 0 | 0 | 0 | 1 | X | X | 0 | 0 | 0 | 0 | 0 | 0 | 0 | 0 | 0 | 1 | 8 |
| 356 + (y)128 | 2 | y | 0 | 0 | 0 | 0 | 1 | X | X | 0 | 0 | 0 | 0 | 0 | 0 | 0 | 0 | 1 | 8 |
| 357 + (y)128 | 2 | y | 0 | 0 | 0 | 0 | 0 | 1 | X | X | 0 | 0 | 0 | 0 | 0 | 0 | 0 | 1 | 8 |
| 358 + (y)128 | 2 | y | 0 | 0 | 0 | 0 | 0 | 0 | 1 | X | 0 | 0 | 0 | 0 | 0 | 0 | 0 | 1 | 8 |
| 359 + (y)128 | 2 | y | 0 | 0 | 0 | 0 | 0 | 0 | 0 | 1 | 0 | 0 | 0 | 0 | 0 | 0 | 0 | 1 | 8 |
| 360 + (y)128 | 2 | y | 0 | 0 | 0 | 0 | 0 | 0 | 0 | 0 | 1 | X | X | 0 | 0 | 0 | 0 | 1 | 8 |
| 361 + (y)128 | 2 | y | 0 | 0 | 0 | 0 | 0 | 0 | 0 | 0 | 0 | 1 | X | X | 0 | 0 | 0 | 1 | 8 |
| 362 + (y)128 | 2 | y | 0 | 0 | 0 | 0 | 0 | 0 | 0 | 0 | 0 | 0 | 1 | X | X | 0 | 0 | 1 | 8 |
| 363 + (y)128 | 2 | y | 0 | 0 | 0 | 0 | 0 | 0 | 0 | 0 | 0 | 0 | 0 | 1 | X | X | 0 | 1 | 8 |
| 364 + (y)128 | 2 | y | 0 | 0 | 0 | 0 | 0 | 0 | 0 | 0 | 0 | 0 | 0 | 0 | 1 | X | X | 1 | 8 |

Example legal encodings for compressing one branch in an L2 cache to one branch in an L3 cache are set forth in TABLE VII below. In TABLE VII, the encoding provides 4-bit L2 branch information (see TABLES V-I through V-IX) for the single branch, in what bucket the single branch ends and corresponding predecode bits (where an "X" indicates a bit that requires a simple decoder to determine whether an instruction ends in an associated byte). While not shown in TABLE VII, 1-bit is included in the encoding to track the number of branches in a fetch window. The first line of TABLE VII has an encoding of 512 and the last line has an encoding of 541 for the 4-bit L2 cache branch information of 0000 (i.e., z=0). In general, the encodings for the different branch information follow a pattern of 512+32(z), where 'z' ranges from zero (0000) to fifteen (1111), for a first line of TABLE VII. For example, the entries in TABLE VII vary from 512-541 for the 4-bit L2 cache branch information encoding of 0000 and the entries in TABLE VII vary from 544-573 for the 4-bit L2 cache branch information encoding of 0001.

TABLE VII

| | | | Branch Bucket | | | | | | | | | | | | | | | | | | | |
|---|---|---|---|---|---|---|---|---|---|---|---|---|---|---|---|---|---|---|---|---|---|---|
| | | | 0 | 1 | | 2 | | 3 | | 4 | | 5 | | 6 | | 7 | | 8 | | | |
| | | | | | | | | | | Instruction Byte | | | | | | | | | | | |
| | | | 0 | 1 | 2 | 3 | 4 | 5 | 6 | 7 | 8 | 9 | 10 | 11 | 12 | 13 | 14 | 15 | | |
| Encoding (9-0) | L2 Branch Info (8-5) | | | | | | | | | Compressed End Bits (4-0) | | | | | | | | | | Branch Ends in Bucket |
| 512 + 32(z) | z | | 1 | X | X | 0 | 0 | 0 | 0 | 0 | 0 | 0 | 0 | 0 | 0 | 0 | 0 | 0 | 0 |
| 513 + 32(z) | z | | 1 | X | X | 0 | 0 | 0 | 0 | 0 | 0 | 0 | 0 | 0 | 0 | 0 | 0 | 0 | 1 |
| 514 + 32(z) | z | | 0 | 1 | X | X | 0 | 0 | 0 | 0 | 0 | 0 | 0 | 0 | 0 | 0 | 0 | 0 | 1 |
| 515 + 32(z) | z | | 0 | 0 | 1 | X | X | 0 | 0 | 0 | 0 | 0 | 0 | 0 | 0 | 0 | 0 | 0 | 1 |
| 516 + 32(z) | z | | 0 | 0 | 1 | X | X | 0 | 0 | 0 | 0 | 0 | 0 | 0 | 0 | 0 | 0 | 0 | 2 |
| 517 + 32(z) | z | | 0 | 1 | X | X | 0 | 0 | 0 | 0 | 0 | 0 | 0 | 0 | 0 | 0 | 0 | 0 | 2 |
| 518 + 32(z) | z | | 0 | 0 | 0 | 1 | X | X | 0 | 0 | 0 | 0 | 0 | 0 | 0 | 0 | 0 | 0 | 2 |
| 519 + 32(z) | z | | 0 | 0 | 0 | 0 | 1 | X | X | 0 | 0 | 0 | 0 | 0 | 0 | 0 | 0 | 0 | 2 |
| 520 + 32(z) | z | | 0 | 0 | 0 | 1 | X | X | 0 | 0 | 0 | 0 | 0 | 0 | 0 | 0 | 0 | 0 | 3 |
| 521 + 32(z) | z | | 0 | 0 | 0 | 0 | 1 | X | X | 0 | 0 | 0 | 0 | 0 | 0 | 0 | 0 | 0 | 3 |
| 522 + 32(z) | z | | 0 | 0 | 0 | 0 | 0 | 1 | X | X | 0 | 0 | 0 | 0 | 0 | 0 | 0 | 0 | 3 |
| 523 + 32(z) | z | | 0 | 0 | 0 | 0 | 0 | 0 | 1 | X | 0 | 0 | 0 | 0 | 0 | 0 | 0 | 0 | 3 |
| 524 + 32(z) | z | | 0 | 0 | 0 | 0 | 0 | 1 | X | X | 0 | 0 | 0 | 0 | 0 | 0 | 0 | 0 | 4 |
| 525 + 32(z) | z | | 0 | 0 | 0 | 0 | 0 | 0 | 1 | X | 0 | 0 | 0 | 0 | 0 | 0 | 0 | 0 | 4 |
| 526 + 32(z) | z | | 0 | 0 | 0 | 0 | 0 | 0 | 1 | 0 | 0 | 0 | 0 | 0 | 0 | 0 | 0 | 0 | 4 |
| 527 + 32(z) | z | | 0 | 0 | 0 | 0 | 0 | 0 | 0 | 1 | X | X | 0 | 0 | 0 | 0 | 0 | 0 | 4 |
| 528 + 32(z) | z | | 0 | 0 | 0 | 0 | 0 | 0 | 0 | 1 | X | X | 0 | 0 | 0 | 0 | 0 | 0 | 5 |
| 529 + 32(z) | z | | 0 | 0 | 0 | 0 | 0 | 0 | 0 | 0 | 1 | X | X | 0 | 0 | 0 | 0 | 0 | 5 |
| 530 + 32(z) | z | | 0 | 0 | 0 | 0 | 0 | 0 | 0 | 0 | 0 | 1 | X | X | 0 | 0 | 0 | 0 | 5 |
| 531 + 32(z) | z | | 0 | 0 | 0 | 0 | 0 | 0 | 0 | 0 | 0 | 1 | X | X | 0 | 0 | 0 | 0 | 6 |
| 532 + 32(z) | z | | 0 | 0 | 0 | 0 | 0 | 0 | 0 | 0 | 0 | 0 | 1 | X | 0 | 0 | 0 | 0 | 6 |
| 533 + 32(z) | z | | 0 | 0 | 0 | 0 | 0 | 0 | 0 | 0 | 0 | 0 | 1 | X | X | 0 | 0 | 0 | 6 |
| 534 + 32(z) | z | | 0 | 0 | 0 | 0 | 0 | 0 | 0 | 0 | 0 | 0 | 0 | 1 | X | X | 0 | 0 | 6 |
| 535 + 32(z) | z | | 0 | 0 | 0 | 0 | 0 | 0 | 0 | 0 | 0 | 0 | 0 | 1 | X | X | 0 | 0 | 7 |
| 536 + 32(z) | z | | 0 | 0 | 0 | 0 | 0 | 0 | 0 | 0 | 0 | 0 | 0 | 0 | 1 | X | X | 0 | 7 |

TABLE VII-continued

| | | Branch Bucket | | | | | | | | | | | | | | | | | | | | |
|---|---|---|---|---|---|---|---|---|---|---|---|---|---|---|---|---|---|---|---|---|---|---|
| | | 0 | 1 | | 2 | | 3 | 4 | | 5 | | 6 | | 7 | | 8 | | | | | | |
| | | Instruction Byte | | | | | | | | | | | | | | | | | | | | |
| | | 0 | 1 | 2 | 3 | 4 | 5 | 6 | 7 | 8 | 9 | 10 | 11 | 12 | 13 | 14 | 15 | | | | | |
| Encoding (9-0) | L2 Branch Info (8-5) | | | | | | | Compressed End Bits (4-0) | | | | | | | | | | Branch Ends in Bucket | | | | |
| 537 + 32(z) | z | 0 | 0 | 0 | 0 | 0 | 0 | 0 | 0 | 0 | 0 | 0 | 0 | 0 | 1 | X | X | 7 |
| 538 + 32(z) | z | 0 | 0 | 0 | 0 | 0 | 0 | 0 | 0 | 0 | 0 | 0 | 0 | 0 | 0 | 1 | X | 7 |
| 539 + 32(z) | z | 0 | 0 | 0 | 0 | 0 | 0 | 0 | 0 | 0 | 0 | 0 | 0 | 1 | X | X | | 8 |
| 540 + 32(z) | z | 0 | 0 | 0 | 0 | 0 | 0 | 0 | 0 | 0 | 0 | 0 | 0 | 0 | 1 | X | | 8 |
| 541 + 32(z) | z | 0 | 0 | 0 | 0 | 0 | 0 | 0 | 0 | 0 | 0 | 0 | 0 | 0 | 0 | 1 | | 8 |

In the x86 ISA there is one branch (i.e., the C3 opcode, which is a return opcode) that is a single byte. In general, the disclosed L3 compression scheme works for 1-byte branches, assuming that two 1-byte branches do not occur back-to-back. In the two-branch to one-branch L3 compression scheme there are 109 legal combinations that encode an end of a branch and an end of a previous instruction to the branch. In the two-branch to one-branch L3 compression scheme 7-bits are used to encode an end of a branch and an end of a previous instruction to the branch, 1-bit is used to encode whether the marked branch is a conditional branch (which aids in branch prediction), and 2-bits are used to encode the number of branches (0, 1, or 2 branches). Storing information about the number of branches allows for the determination of whether the two-branch to one-branch L3 compression scheme or the one-branch to one-branch L3 compression scheme is being employed or whether there are zero branches in Which case the rest of the encoding is ignored.

In general, a decoder constructed according to the present disclosure has two modes of operation: a predecode mode in which predecode information is not available; and a decode mode in which predecode information is available. In this embodiment, the decoder decodes four bytes/cycle in predecode mode and three instructions/cycle in decode mode. In a typical implementation there is a penalty for operating in predecode mode as instruction boundaries are unknown. In decode mode instruction boundaries are known and, as such, decoding speed is improved. In general, when instruction boundaries are known, instructions may be decoded in parallel. When instruction boundaries are unknown, then decoding of a next instruction is dependent upon decoding a previous instruction.

While at least one exemplary embodiment has been presented in the foregoing detailed description, it should be appreciated that a vast member of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A memory subsystem, comprising:
a first memory configured to store instruction bytes of a fetch window, wherein the first memory is further configured to store first predecode information and first branch information that characterizes the instruction bytes of the fetch window;
a second memory configured to store the instruction bytes of the fetch window upon eviction of the instruction bytes from the first memory, wherein the second memory is further configured to store combined predecode/branch information that also characterizes the instruction bytes of the fetch window;
a first compressor coupled between the first memory and the second memory, wherein the first compressor is configured to compress the first predecode information and the first branch information into the combined predecode/branch information without compressing the instruction bytes of the fetch window; and
a first decompressor coupled between the second memory and a third memory, wherein the first decompressor is configured to decode at least some of the instruction bytes stored in the second memory to convert the combined predecode/branch information into second predecode information for storage in the third memory, wherein the second predecode information corresponds to an uncompressed version of the first predecode information.

2. The memory subsystem of claim 1, further comprising:
a second compressor coupled between the third memory and the first memory, wherein the second compressor is configured to compress the second predecode information into the first predecode information and to compress second branch information into the first branch information upon eviction of the instruction bytes from the third memory; and
a second decompressor coupled between the first memory and the third memory, wherein the second decompressor is configured to decode at least some of the instruction bytes stored in the second memory to convert the first predecode information into the second predecode information for storage in the third memory when the instruction bytes are returned from the first memory to the third memory.

3. The memory subsystem of claim 2, wherein the fetch window includes sixteen of the instruction bytes, the second predecode information includes sixteen bits, the first predecode information includes ten bits, the second branch information includes twenty-seven bits, the first branch information includes eight bits, and the combined predecode/branch information includes ten bits.

4. The memory subsystem of claim 2, wherein the first decompressor is also configured to decode, from the combined predecode/branch information, branch-related information for a single branch included within the instruction bytes for storage in the third memory.

5. The memory subsystem of claim 4, wherein the branch-related information indicates a branch type of the single branch.

6. The memory subsystem of claim 5, wherein the branch-related information indicates whether the single branch is an indirect branch or a direct branch.

7. The memory subsystem of claim 6, wherein the branch-related information indicates a byte displacement for the direct branch.

8. The memory subsystem of claim 4, wherein the branch-related information indicates a bucket in which the single branch ends.

9. The memory subsystem of claim 4, wherein the branch-related information indicates whether the single branch is dynamic.

10. The memory subsystem of claim 4, wherein the branch-related information indicates a number of branches included within the instruction bytes.

11. A method of maintaining information in a memory subsystem, comprising:
    storing instruction bytes of a fetch window in a first memory;
    storing first predecode information and first branch information that characterizes the instruction bytes of the fetch window in the first memory;
    storing the instruction bytes of the fetch window in a second memory upon eviction of the instruction bytes from the first memory;
    compressing the first predecode information and the first branch information into combined predecode/branch information that also characterizes the instruction bytes of the fetch window;
    storing the combined predecode/branch information in the second memory;
    decoding at least some of the instruction bytes stored in the second memory to convert the combined predecode/branch information into second predecode information for storage in a third memory, wherein the second predecode information corresponds to an uncompressed version of the first predecode information;
    compressing the second predecode information into the first predecode information upon eviction of the instruction bytes from the third memory; and
    decoding at least some of the instruction bytes stored in the second memory to convert the first predecode information into the second predecode information for storage in the third memory when the instruction bytes are returned from the second memory to the third memory.

12. The method of claim 11, wherein the fetch window includes sixteen of the instruction bytes, the second predecode information includes sixteen bits, the first predecode information includes ten bits, the second branch information includes twenty-seven bits, the first branch information includes eight bits, and the combined predecode/branch information includes ten bits.

13. The method of claim 11, further comprising:
    decoding, from the combined predecode/branch information, branch-related information for a single branch included within the instruction bytes for storage in the third memory; and
    storing the branch-related information in the third memory.

14. A processor, comprising:
    a load/store unit;
    a first memory coupled to the load/store unit, wherein the first memory is configured to store instruction bytes of a fetch window, and wherein the first memory is further configured to store first predecode information and first branch information that characterizes the instruction bytes of the fetch window;
    a second memory configured to store the instruction bytes of the fetch window upon eviction of the instruction bytes from the first memory, wherein the second memory is further configured to store combined predecode/branch information that also characterizes the instruction bytes of the fetch window; and
    a first compressor coupled between the first memory and the second memory, wherein the first compressor is configured to compress the first predecode information and the first branch information into the combined predecode/branch information without compressing the instruction bytes of the fetch window.

15. The processor of claim 14, further comprising:
    a first decompressor coupled between the second memory and a third memory, wherein the first decompressor is configured to decode at least some of the instruction bytes stored in the second memory to convert the combined predecode/branch information into second predecode information for storage in the third memory, wherein the second predecode information corresponds to an uncompressed version of the first predecode information;
    a second compressor coupled between the third memory and the first memory, wherein the second compressor is configured to compress the second predecode information into the first predecode information and to compress second branch information into the first branch information upon eviction of the instruction bytes from the third memory; and
    a second decompressor coupled between the first memory and the third memory, wherein the second decompressor is configured to decode at least some of the instruction bytes stored in the second memory to convert the first predecode information into the second predecode information for storage in the third memory when the instruction bytes are returned from the first memory to the third memory.

16. The processor of claim 15, wherein the first decompressor is also configured to decode, from the combined predecode/branch information, branch-related information for a single branch included within the instruction bytes for storage in the third memory.

17. The processor of claim 16, wherein the branch-related information indicates a branch type of the single branch and whether the single branch is an indirect branch or a direct branch.

18. The processor of claim 17, wherein the branch-related information indicates a byte displacement for the direct branch and a bucket in which the single branch ends.

19. The processor of claim 18, wherein the branch-related information indicates whether the single branch is dynamic and a number of branches included within the instruction bytes.

* * * * *